(12) United States Patent
Streuber

(10) Patent No.: US 6,481,911 B1
(45) Date of Patent: Nov. 19, 2002

(54) JOINTING METHOD FOR JOINING PREFORMED BODIES

(76) Inventor: Fritz Michael Streuber, Bakusbrink 27, 32120 Hiddenhausen (DE)

(*) Notice: Subject to any disclaimer, the term of this patent is extended or adjusted under 35 U.S.C. 154(b) by 0 days.

(21) Appl. No.: 09/449,367

(22) Filed: Nov. 24, 1999

(51) Int. Cl.[7] .................................................. F16L 33/16
(52) U.S. Cl. ........................... 403/5; 403/297; 403/280
(58) Field of Search ................................. 403/267, 269, 403/335, 336, 338, 297, 277, 280, 5; 285/97, 364, 365, 337; 277/605, 617; 428/613; 296/205

(56) References Cited

U.S. PATENT DOCUMENTS

| | | | |
|---|---|---|---|
| 3,473,829 A | * 10/1969 | Daniels | 277/605 X |
| 3,669,474 A | * 6/1972 | Bode | 285/365 |
| 3,791,681 A | * 2/1974 | Moldow | 285/364 X |
| 3,832,820 A | 9/1974 | Eggert | |
| 3,940,008 A | * 2/1976 | Flanders | 285/364 X |
| 4,440,434 A | * 4/1984 | Celli | 296/205 X |
| 4,531,856 A | * 7/1985 | Gebelius | 403/5 X |
| 4,915,537 A | * 4/1990 | Bergheim et al. | 403/5 X |
| 5,151,246 A | 9/1992 | Baumeister et al. | |
| 6,135,542 A | * 10/2000 | Emmelmann et al. | 296/205 |

FOREIGN PATENT DOCUMENTS

| | | |
|---|---|---|
| DE | 2 147 063 | 5/1972 |
| DE | 2 211 180 | 3/1974 |
| DE | 41 01 630 C2 | 12/1991 |
| DE | 43 18 540 A1 | 12/1994 |
| DE | 44 26 627 C2 | 2/1995 |
| DE | 44 16 371 A1 | 11/1995 |
| DE | 196 12 781 C1 | 8/1997 |
| DE | 197 17 894 A1 | 11/1997 |
| EP | 0 701 633 B1 | 3/1996 |
| EP | 0 844 167 A2 | 5/1998 |
| FR | 1.155.740 | 5/1958 |
| FR | 2 340 811 | 9/1997 |
| JP | 55-109634 | 8/1980 |
| JP | 10-058575 | 3/1998 |
| JP | 10-175567 | 6/1998 |

OTHER PUBLICATIONS

Sedliaková, N.; Simančik, F.; Kováčik; and Minár, P., "Joining of Aluminium Foams," *Metallschäume*, 1997, pp. 177–185, MIT Bremen, Germany.

European Search Report of EP 99 12 3187 dated Oct. 19, 2000.

* cited by examiner

*Primary Examiner*—Lynne H. Browne
*Assistant Examiner*—John R. Cottingham
(74) *Attorney, Agent, or Firm*—RatnerPrestia

(57) ABSTRACT

In a jointing method for joining preformed bodies, a first preformed body (1) and a second preformed body (2) are located relative to each other. By use of a jointing clamp (10) in a jointing zone of the preformed bodies (1, 2) a space (9) is encased into which each of the preformed bodies (1, 2) protrudes. In the encased space (9), a filler (20; 21; 20, 21) is consolidated or exposed to a consolidation such that the preformed bodies (1, 2) in the encased space (9) are compacted into a solid composite by the jointing clamp (10) and the consolidated filler (20; 21; 20, 21).

24 Claims, 15 Drawing Sheets

US 6,481,911 B1

JOINTING METHOD FOR JOINING PREFORMED BODIES

Figure 1A:
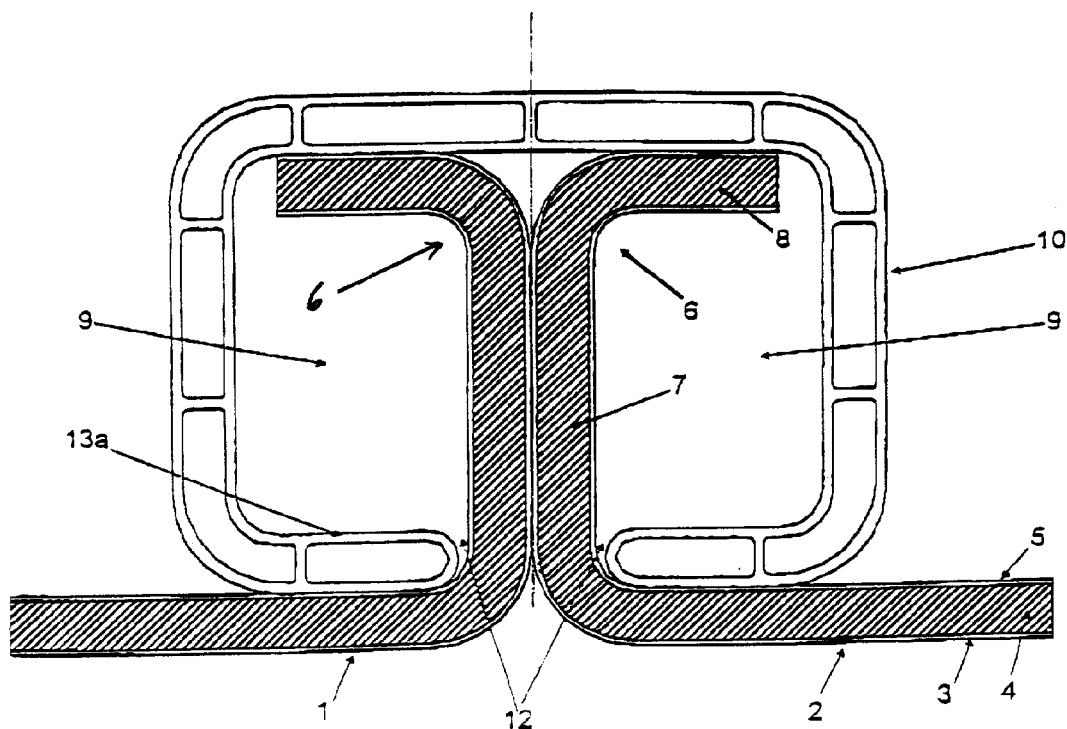
Figure 1B:
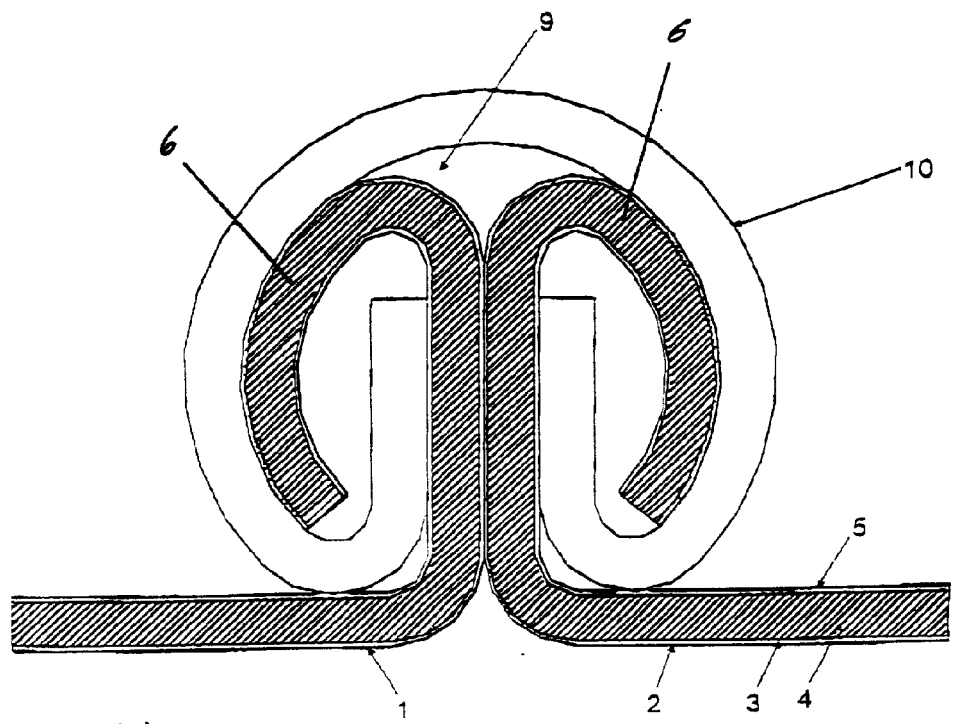
Figure 1C:
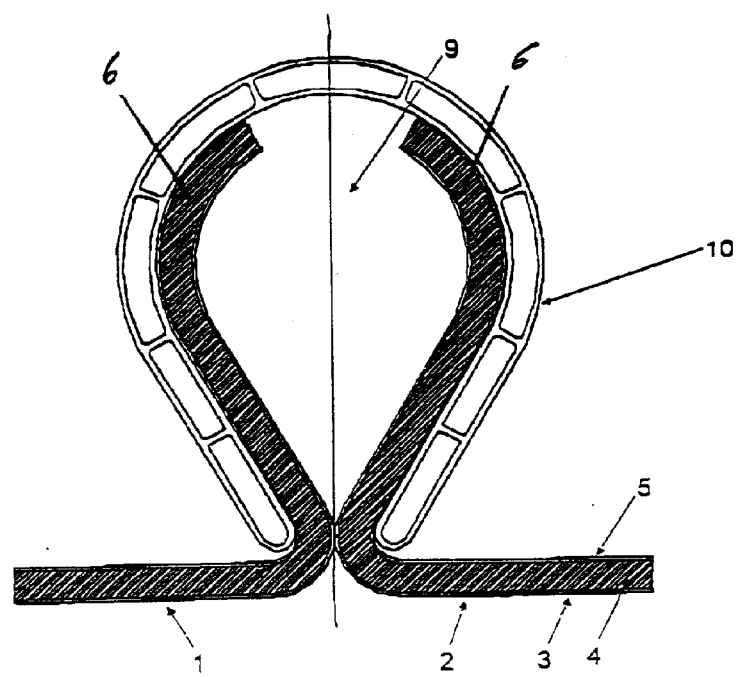

The invention relates to a jointing method for joining preformed bodies and to a composite of preformed bodies.

It is especially in light-weight structural engineering that has always been a problem in joining individual structures—termed preformed bodies in the following—in keeping with the requirements of the later application. What is required more particularly is a combination of high mechanical loading capacity and durability with minimum weight and optimum cost effectiveness for the composite and thus also for jointing. This is also basically a problem in other fields, for instance, in shipbuilding, where particularly large-area preformed bodies, for example hull segments, need to be joined to each other.

One possibility of saving weight is to make use of preformed bodies of a foamed material, more particularly of a metal foam material or fractions of such materials. Proposed in DE 43 18 540 A1 is the use of metal foam material in automobile production in which body panels are employed as foamed metal preformed bodies comprising one or two solid metal skins and a foamed layer of metal foam. For securing fitted items to these body panels mention is made of self-cutting screws and dowel-type fasteners. In the publication "Metallschaume 1997", MIT Bremen, in the article entitled "Joining of Aluminum Foams" by N. Sedliakova et. al., screw fasteners, soldered, cemented and welded joints as well as the use of foamed fasteners are described as methods of joining foamed metal preformed bodies. Similar is the procedure with laminated plastics/metal bodies, i.e. preformed bodies which consist of a layer of plastics and at least one layer of a metallic material. Known for these materials are rivet, screw and cemented joints.

These are the accepted methods for joining preformed bodies, the advantages and disadvantages of which are well known in engineering. Also, the joining of two or more preformed bodies made exclusively of laminated plastics bodies and even exclusively of metal by such methods is in many cases problematic.

An object of the invention is to provide a firm composite of preformed bodies and to provide a jointing technique suitable for fabricating the composite. More particularly, an intention is to enable preformed bodies of laminated composite materials to be joined together into a firm composite. Preferably, it is achieved that preformed bodies of any kind of material, even dissimilar materials can be joined together.

In a first step in accordance with the invention, the preformed bodies to be joined are located relative to each other in their position required for the composite. Preferably, they are clamped to each other. In a jointing zone in which the preformed bodies are to be joined, a space, into which the preformed bodies protrude, is encased by a jointing clamp and thus defined. The jointing clamp may be the clamping just mentioned for locating the preformed bodies prior to forming the composite, or it may be positioned not until after locating. An encasement of the encased space may be formed by the jointing clamp and the preformed bodies in common. Preferably, the jointing clamp forms the encasement by itself and the preformed bodies protrude into the space encased as defined. The encasement of this space is preferably closed on all sides, but may also, however, in principle have openings, more particularly be perforated. A filler is filled into the space encased by the jointing clamp or positioned already prior to the jointing clamp being positioned in the jointing zone, which in this case is then subsequently encased. Preferably, first the encased space is formed and then the filler is filled into the encased space. The filler is arranged such that, once the filler has consolidated, a compacting pressure materializes in the encased space which is received by the encasement and acts on the preformed bodies in the encased space, thus resulting in the preformed bodies being compacted into a solid composite by both the jointing clamp and the filler.

The filler consolidates from a preferably flowable condition. Not only a fluid material, but also a foamable material, preferably a foamable plastics material, put into the encased space for foaming and subsequently consolidated is flowable during foaming according to the invention and represents a preferred filler. In principle, it is not necessary that the filler be flowable prior to consolidating, although this is preferred. It may also be consolidated from a plastic or elastic condition by being compressed. After consolidating, the filler may be elastic, it preferably being rigid, i.e. not pliant after consolidation.

The filler is filled preferably so that it fills out the encased space totally, although in principle partial filling is sufficient to produce a reliable joint, preferably both positively and non-positively of the preformed bodies which in the anticipated loading conditions receive and transfer the forces involved. The filler urges against the encasement from within. The preformed bodies, jointing clamp and filler combine to form a compacted composite.

The jointing clamp is formed by a tubular cylindrical section or comprises a tubular cylindrical section, preferably an elongated tubular cylindrical section with which the jointing clamp forms the encased space. The jointing clamp is provided with an opening or slit in its tubular cylindrical section. The slit extends to advantage up to at least one face end of the tubular cylindrical section, and it being configured particularly preferably as a full-length slit so that the tubular cylindrical section of the jointing clamp is slit throughout longitudinally. The jointing clamp is fitted, mounted, pushed in place or otherwise located relative to the preformed bodies placed in accordance with each other on joining sections configured accordingly on the preformed bodies. In the starting position prepared for press compaction of the filler, joining sections of the preformed bodies to be jointed thus protrude into the space defined by the jointing clamp. Preferably, a joining section protrudes into the space encased by it also when a jointing clamp is configured integrally. A joining section of a preformed body may be formed at an edge of the preformed body or also at any other joining location of the preformed body serving to make the joint.

Preferably, a prefabricated separate jointing clamp is employed as the jointing clamp. This separate jointing clamp is placed on the preformed bodies to be joined by it clasping the preformed bodies or at least parts thereof. In this arrangement, the jointing clamp may already clampingly locate the preformed bodies to be joined together in their position desired for the composite relative to each other. A non-clamping application of the jointing clamp is likewise possible, however.

Should more than two preformed bodies abut in a common jointing zone, such a composite of preformed bodies may be produced particularly simply by using a separate jointing clamp. The jointing clamp provided for this purpose may be formed, for example, by a star-shaped jointing clamp section.

A preformed body preferably employed is a laminated composite comprising at least one structured layer, for example, structured honeycombs, or at least one layer of a foamed material, more particularly a foamed metal or foamed plastics material. This layer is applied to a skin of a compatible base material or is sandwiched between two such skins. A typical material pairing for a preformed body is formed by foamed aluminum and solid aluminum, foamed plastics and solid plastics, foamed plastics and solid aluminum, or a layer of structured plastics or metal in combination with solid plastics or solid metal. One, several, or each of the preformed bodies to be joined may also consist solely of a foamed material.

The invention also lends itself to advantage in fabricating preformed bodies of conventional plastics, sheet metal or other profiles, sections or shells. More particularly, it is of advantage in joining all materials which are problematic in thermal jointing methods, for example welding or soldering. In metal/plastic laminates this is clear due to the greatly differing jointing temperatures, for example in welding. In other example applications, such as for instance in joining titanium sheet preformed parts, the invention is likewise of advantage since, otherwise, such materials can be welded or soldered only in a closed inert gas atmosphere where they must remain until having cooled to ambient temperature or else oxidation would greatly detriment the material properties.

The filler involved is preferably a cold or semi-cold formable plastics material or metallic material or a combination thereof. A metallic material having a softening temperature at which the preformed bodies retain their shape and stability is flowable in accordance with the invention, namely on attaining its specific softening temperature.

Plastics material used as the filler may be a single or multi-component material, reinforced or non-reinforced, foamed material, a synthetic resin, an injection molding compound or extrusion molding compound or a combination of several of these plastics materials.

In preferred embodiments the filler is put into the encased space in a flowable condition. It is also just as possible that a filler is present in the encased space in a solid condition, for instance as a granulate, and is transformed into the flowable condition in the course of the jointing procedure. Preferably, its transformance occurs by melting or foaming. Consolidating the filler then produces the compacted composite.

For its consolidation, especially curing, the filler may be heated, although it is also just as possible to make use of a filler which consolidates at ambient temperature. If a filler is used which expands on consolidating, for example a foam material, then it suffices to simply fill the encased space with this filler to achieve a compacted composite. Should the filler not expand, or even shrink on consolidating, an expander is arranged to advantage in the encased space by means of which the filler is urged against the encasement. An expander may also be used to advantage in conjunction with a filler, which expands on consolidating, to form the compacted composite.

The expander may be a means with which the filler is filled into the encased space pressurized and held there under pressure until its consolidates. However, the expander may also be a means with which a reaction fluid is put into a filler formed by a plastics material when the filler is already located in the encased space. By the action of the reaction fluid, foaming of the plastics material is influenced, preferably controlled. Foaming may be initiated, boosted, diminished or discontinued by the reaction fluid. The reaction fluid may be in particular a foaming agent. The expander comprises in a further embodiment an expandable pressure conduit arranged in the encased space By expanding the pressure conduit, pressure is exerted on the surrounding filler, as a result of which the filler is urged against the encasement.

Advantageously, filler particles such as chopped fibers of glass, carbon or some other material may be filled together with a flowable filler or prior thereto to further enhance a non-positive and/or positive connection of the components involved in the composite.

In a preferred further embodiment, the space encased by the jointing clamp is thermally treated from within. Thermal treatment for heating or cooling, or for heating and cooling, may be formed, in principle, by any suitable kind of cooling or heating means, for example by the application of electrical energy. Preferably, at least one flow conduit is arranged in the encased space through which a cooling or heating fluid is guided. Internal thermal treatment is particularly of advantage when use is made of hot crosslinked resins, thermosetting plastics or thermoplastics formulated with foaming agents to foam at the processing temperature.

In a preferred embodiment, thermal treatment fluid is directed into the encased space in counterflow. For this purpose, two flow conduits may be oriented side by side closely spaced or in direct thermal conductive contact with each other, through which the thermal treatment fluid is passed in counterflow. In both flow conduits, thermal treatment fluid is introduced at the desired temperature and passes through in counterflow. Along the pair of flow conduits, the thermal treatment temperature materializes particularly constant. Instead of a thermal treatment fluid passing through flow conduits separately in flow, it may also be passed through the two flow conduits in sequence. In both flow guidance arrangements, the one of the two flow conduits may surround the other.

In the encased space, several of the pairs of flow conduits, as described above, may be arranged, indeed, combinations of pairs of flow conduits and single flow conduits may also be formed.

By means of a nested flow conduit configuration and guidance of the thermal treatment fluid therethrough in counterflow, the temperature of the thermal treatment means and, thus ultimately, of the foamed metal is set particularly uniformly over a long length of flow conduit. In accordance with one particularly preferred embodiment of nested flow conduits, one outer flow conduit accommodating an inner flow conduit is closed off at one end which may be located in the filler. For heating, the hot thermal treatment fluid is introduced into the inner flow conduit through which it flows, and emerges therefrom at the closed end of the outer flow conduit to enter therein before then flowing in the intermediate space between the inner and outer flow conduit back to a thermal treatment means. During this, a compensation in the heat occurs between the thermal treatment fluid in the inner flow conduit and the return flow of thermal treatment fluid. This results in a particularly uniform temperature of the return flow of the thermal treatment fluid over the full length of the flow conduit.

Instead of the blind thermal treatment means as described above, in which the thermal treatment fluid is led in and out at the same end, the thermal treatment fluid may also be led in and out at the opposite ends of these flow conduits in each case. This is only possible, however, when the inner and outer flow conduits are brought out at both ends from the encased space. Accordingly, in the following, reference is made simply in general to an outer flow of fluid instead of a return flow of fluid.

The inner flow conduit is preferably located over its full length centrally spaced away from the outer flow conduit. This may be achieved by means of spacers arranged between the inner flow conduit and the outer flow conduit. These spacers are made of a heat resistant material, for instance of ceramics.

Preferably, the outer flow of the thermal treatment fluid is turbulent, as a result of which the heat conducted from the inner flow conduit into the outer flowing thermal treatment fluid and from the outer flowing thermal treatment fluid to the filler is enhanced as compared to that of a laminar flow. The spacers may be configured accordingly as the means for producing turbulence. It is particularl preferred to produce the turbulent outer flow by means of a tape, wound spirally around the inner flow conduit. In a preferred embodiment, such a tape simultaneously serves as a spacer, i.e. no further spacers are needed in addition thereto. Preferably, the tape is configured as a woven tape, more particularly of heat resistant fibers such as e.g. glass, ceramic or carbon fibers. Due to the tape being wound spirally around the inner flow conduit, the thermal treatment fluid is, likewise, guided and swirled spirally in the intermediate space between the inner and outer flow conduit.

In the event of using nested flow conduits, the outer flow conduit may remain in the filler structure upon completion of consolidation. The remaining outer flow conduit improves the mechanical properties of the preformed body, especially when the internal thermal treatment is undertaken in a jointing zone of several preformed bodies. The inner flow conduit as well as the spacers, or the fiber tape, may be preferably removed from the outer flow conduit to be available for repeat use. The inner flow conduit and the spacers, or the fiber tape replacing the spacers, may, likewise, remain in the encased space, however. By preferably filling out the cavity, surrounded by the outer flow conduit, with plastics material, the preformed body or the composite zone may be further reinforced mechanically. It is particularly preferred to make use of a flow conduit or nested flow conduits made of carbon fiber material, thus resulting in a carbon-reinforced composite.

A thermal treatment system comprises preferably an internal combustion engine with a turbocharger, the exhaust air being employed as the heating fluid, the intake air to the charger being used as the cooling fluid. The force driving the engine may be used to generate electricity.

A flow conduit, arranged in the jointing zone, may be made use of not only for thermal treatment but also, or instead thereof, for bringing in materials, particularly fillers. It may be used to advantage to impregnate a bundle of reinforcement fibers or a composite of fiber bodies, more particularly with a fluid plastics material, a binding agent or a reaction fluid. The fluid involved is advantageously conveyed by means of a pump through the fiber composite until complete saturation of the fibers of the bundle or of the fiber composite and filling of the encased space is assured.

Where several flow conduits are configured in the jointing zone, multi-component plastics, more particularly two-component plastics, for example resin and a hardener, may be brought into the encased space and sited to react.

A flow conduit serving to place material in the encased space is provided preferably with a plurality of openings, i.e. perforated, to bring a thermal treatment fluid, binding fluid or reaction fluid, evenly distributed, into contact with the plastics material, or to bring in the plastics material itself.

In preferred embodiments, a pressure conduit, expandable by internal pressure, is arranged in the encased space. The plastics material present in the encased space or part thereof is urged against the encasement by the expanded pressure conduit. By making use of such an expander, fillers subject to a reduction in volume during consolidation are also available for a compacted composite in accordance with the invention.

Filling and consolidating such materials in pressurizing the encased space in all, as likewise possible in principle, is not necessary. The filler is urged particularly uniformly against the defining surface areas of the encased space, any tendency to shrinkage being reliably compensated.

In preferred variants of the method in accordance with the invention, the pressure conduit is cyclically impinged with alternating pressure and temperature. Due to such a process of temperature and pressure change, preferably a plastics material, brought into the encased space, having reinforcing components, e.g. an epoxy resin/carbon fiber matrix is consolidated. Implementing reproducible alternating temperature and pressure cycles permits a particularly uniform curing and consolidation of the filler filled into the encased space. In the varying pressure cycles, overpressure and vacuum alternate to advantage as measured relative to the environment. Any gas pockets, in particular trapping of air in the filler, more particularly in a fluid filler such as, for example, synthetic resin, are eliminated by generating a vacuum in the encased space.

In a preferred first aspect, a tubular pressure conduit is formed by a flexible material, for example silicone. A pressure conduit of an elastic material is particularly of advantage for pressure alternation.

In a preferred second aspect, the tubular pressure conduit is formed by a cold-formable metal, a material suitable in this respect being e.g. AlMg5MnN. By charging the pressure conduit with a sufficiently high internal pressure, it is expanded to such an extent that a solid compacted composite materializes. In the scope of the deformation, the apparent yielding point of the metal forming the pressure conduit is exceeded to such an extent that no return formation occurs in the range of application temperatures of the composite of preformed bodies. The jointing clamp, and to a lesser extent also the preformed bodies, limit the deformation of the pressure conduit.

By heating the pressure conduit, especially by means of a heated pressurizing fluid, expansion may also be made by way of a semi-cold forming procedure; significantly lower fluid pressures can then be worked with when heating is applied, so that correspondingly less force needs to be handled by the jointing clamp in order to accommodate the increase in the internal pressure. As evident from the flow curves, for example of the material AlMg5MnN, the logarithmic forming limit may be doubled at temperatures of around 200° C. under the conditions of uniform stretcher-level. Semi-cold forming is done preferably at a temperature within the range of 100 to 300° C.

It is particularly of advantage for the combination of materials when the softening temperature of the pressure conduit material equals the melting temperature of the filled filler, which is preferably a plastics material. The softening temperature of the pressure conduit and the melting temperature of the filler should be lower than the first glow temperature (Losglühtemperatur) and the melting temperature of the materials of the preformed bodies and the jointing clamp respectively.

On expansion of a pressure conduit in the encased space, the jointing clamp is designed preferably so stiff that it accommodates the resulting pressure load without deforming. In an advantageous dual function, a flow conduit for a thermal treatment fluid doubles as the pressure conduit which brings about, or assists in bringing about, compacting in the encased space. In addition to the flow conduit, which is preferably made from a cold-formable metal, for example AlMg5MnN, a thermoplastic material, for example polyamide or thermoplastic polyurethane, with or without a reinforcement material, is brought into the encased space between the conduit and the encasement. Subsequently, the fluid in the flow conduit is heated to the processing temperature of the plastics material, for example in the case of polyamide, to a temperature ranging from 185 to 240° C. Once the melting temperature of the thermoplastic has been attained, the pressure conduit is charged with the pressure necessary for its semi-cold forming. The pressure conduit expands and fills out the encased space together with the melted plastics material. Upon maintenance of the pressure, the pressure conduit is led into a dimensionally stable phase by the introduction of a cooling fluid. This results in a stable compacted composite.

Producing the compacted composite of preformed bodies by cold or semi-cold forming of a pressure conduit, inserted in the encased space, may also be used alone to produce the composite of preformed bodies, although combining it with a filler, compacted thereby and which is in a flowable condition, is particularly preferred.

It is of advantage when the plastics material seals off the compacted composite. Metallic components in the encased space are thus protected from the ingress of aggressive media, and an uncontrolled corrosion in the interior of the compacted composite is prevented. Thermoplasts employed for this purpose are preferably hydrolysis-stable, for example, thermoplastic polyether-based polyurethane. Thermoplastic polyurethanes (TPU) are also of advantage in this respect since they tend to adhere to the metallic surfaces in the course of the melting procedure.

Making use of thermoplasts as the filler also has the advantage, apart from the special application as cited above, that profiles of any shape, for example extruded profiles, can be formed. In one preferred further development, one such profile, or several such profiles, is/are inserted into the encased space between jointing clamp and preformed body. Preferably, in a previous step, the flow conduit is inserted into a cavity of the thermoplastic profile provided for this purpose, so that flow conduit and thermoplastic profile can be inserted into the encased space in a single step. The thermoplastic profile is preferably designed to be used simultaneously as a spacer for centering the flow conduit in the encased space and doubling as a spring element prelocating the composite of preformed body and jointing clamp in the desired position.

This arrangement is also of advantage in joining curved profiles and preformed bodies, since in this case a specific clearance is needed between preformed bodies and jointing clamp to compensate any possible differing radii, in particular differing bending radii. Prior to final fabrication of the compacted composite, it is assured that the preformed bodies and the jointing clamp or a plurality of jointing clamps are correctly located.

In a preferred aspect, an insertion profile, more particularly a thermoplastic profile, is used to separate non-compatible materials, such as for example stainless steel and aluminum, and to prevent galvanic contact corrosion. For this purpose, the insertion profile is configured such that it totally covers the contact surface areas between preformed bodies and jointing clamp and/or to a flow conduit to be expanded and, thus, form an isolating barrier layer.

It is of advantage when prior to, during, or after positioning of the jointing clamp, a reinforcing structure, or a plurality of reinforcing structures, is/are placed into the jointing zone in addition to the already reinforcing jointing clamp, as a result of which the jointing zone may be enhanced with additional functions. The reinforcing structure is preferably a preformed fiber composite, adapted to the encased space, its fibers being made of plastic, glass, ceramics, mineral, carbon or metal or a combination thereof, said fibers being embedded in a plastics matrix, or a fiber string into which individual fibers are bundled, for example interwoven or only intertwined.

Preferably, once the reinforcing structure has been put into the encased space, the encased space with the reinforcing structure is totally filled with a hot cross-linking resin blend, for example an epoxy resin, preferably at room temperature. This is achieved preferably by means of a pump, for instance a rotary flexible pump, which pumps the resin into the encased space, until the vacuum generated by the pump causes the resin to reemerge from the suction side of the encased space.

When this system works in a closed pump circuit, it is possible to put the required amount of resin into the encased space by a simple volume calculation. It is of advantage that, after the reinforcing structure has been totally impregnated, the residual volume can be reduced to the calculated amount by pumping off the excess resin. Checking the remaining amount of resin can then be simply done by checking the level of the resin in a transparent catchment vessel. At the same time in this procedure, the encased space is evacuated to thus minimize the risk of air inclusions, i.e. blowholes in the resin.

In a subsequent preferred step, a flow conduit is used as a thermal treatment conduit, it being filled with a thermal treatment fluid and heated in a closed circuit to a temperature below the cross-linking temperature of the resin. When an epoxy resin is taken as an example, which cures at 175° C., the thermal treatment fluid is heated to approximately 160° C. Once the thermal treatment fluid has attained this target temperature throughout, the flow conduit is used as a pressure conduit and thus is pressurized until a reshaping process commences. In this respect, the pressure needed depends on the material of the flow conduit. If a flow conduit made of AlMg5MnN (EN AW-5182-0) is used, then the pressure should be around 220–240 MPA. In the course of this semi-cold formation, the flow conduit expands and totally fills the encased space together with the surrounding resin/reinforcing fiber matrix. In a preferred subsequent step, the temperature is increased to the cross-linking temperature of the resin, 175° C. in the previous example, and maintained at this temperature according to the manufacturer's standard time for curing the resin. Meanwhile, the temperature remains unchanged. After curing, the fluid can be cooled to room temperature or replaced by a fluid at room temperature. The pressure is reduced to, finally, empty the flow conduit.

In further steps this method may also be employed to subject the materials used to consolidate the material composite to a subsequent temperature or pressure treatment.

More particularly, more than two preformed bodies may also be joined. For this purpose, a multi-legged bridging element is employed in the zone where the preformed bodies intersect. If pressure conduits are made use of for jointing, is assured while locating the bridging element that intersecting flow conduits cannot squeeze each other on expansion which would choke off the conduit flow. This is assured by the bridging element accommodating the pressure conduits in different levels and restricting expansion of the pressure conduits. The pressures conduits are able to expand into undercuts, preferably configured in the bridging element, to thus be anchored in place thereby.

In all embodiments of the invention, a closure profile may be arranged in a longitudinal slit between the preformed bodies, abutting otherwise therein, level with their plane of contact. The closure profile may serve as a sealing profile or a compensating profile or as a supporting profile or fulfill a combination of these functions.

It is of advantage when the closure profile seals off the encased space longitudinally, thus enabling materials of low viscosity to be more easily processed in the encased space. By means of the closure profile, preformed bodies having joining profiles differing in thickness—for example a single-layer and a multi-layer preformed body—can be more simply joined by a single shape and size of jointing clamp since the closure profile evens out the differences. It is likewise of advantage that, due to a closure profile, a smooth surface is achievable at an outer contour opposite the encased space, for example on vehicles, requiring a smooth outer contour for streamlining.

For certain applications of the composite of preformed bodies it is of advantage when a closure profile has good thermal conductivity. The closure profile, and preferably a flow conduit being used in conjunction, may then be used for thermal treatment, namely for cooling and/or heating a preformed body of the composite. In this arrangement, heat may be directed either from the corresponding preformed body into the flow conduit or vice-versa and received or given off from a fluid in the flow conduit.

Where large preformed bodies are concerned, for example in sailing boat hull structures in the region of shroud and freight container lashing points or aircraft wings, it may be necessary to introduce high forces into the preformed body. For this purpose, a reinforcing structure, arranged in the encased space, may be used in accordance with the invention which, more particularly, may be formed by a fiber bundle or a fiber composite body, but also by a flow conduit. The reinforcing structure is led out from the preformed body composite at one or more suitable points and preferably configured into a lashing point, for example in the form of a lug. Provided preferably where the reinforcing structure is led out is a cap profile or cap section directly clasping the joining profiles of the preformed bodies or preferably the jointing clamp. When a fiber composite body forms the reinforcing structure this preferably constitutes a resin-impregnated fiber composite body, a so-called prepreg. The jointing clamp may also already serve as the reinforcing structure, preferably, however, a reinforcing structure is arranged in the mechanical uncritical zero position of the jointing zone so that it forms a neutral filament or core.

By means of the invention it is now possible to make specific use of the jointing zone of preformed bodies as the reinforcing element of the composite of preformed bodies. The compacted composite in the encasement formed by the jointing clamp already forms a reinforcement of the composite, especially where large structures are concerned. Thus, the jointing zone in accordance with the invention is able to assume the structural-reinforcing function of frames and stringers and can replace such frames and stringers, for example in aircraft and marine engineering or also in automotive engineering where comparable structural-reinforcing members are employed. Particularly suitable for an application of such reinforcing members is a jointing zone in accordance with the invention which has a reinforcing structure, such as for example a fiber composite body or a fiber bundle inserted therein.

Jointing in accordance with the invention proves to be particularly of advantage when the preformed bodies consist of laminates having metal skins. As already mentioned at the outset, prior art jointing techniques pose considerable problems where laminates are concerned since they add to the risk of fracture or rupture. Surface jointing of fiber prepregs and metallic skins is critical due to the poor adhesion between metal and plastic. In addition to this, pretreating the metallic skins with aggressive cleaning and coating agents detriments the properties of these metallic skins. These problems are obviated by the solution in accordance with the invention.

A flow conduit, more particularly a metallic flow conduit, serving as the thermal treatment conduit and/or pressure conduit in producing the composite, may used to advantage for thermal treatment, namely for cooling and/or heating a preformed body of the composite in later applications, especially in aeronautical and aerospatial applications of the composite. Heat may be communicated either from the corresponding preformed body into the flow conduit or vice-versa and received or given off by a fluid in the flow conduit. Instead of thermal energy, or also in combination therewith, the flow conduit may also be used for transporting electrical energy and/or data communication.

By introducing a cooled fluid into a flow conduit, arranged in the jointing zone, the complete jointing zone may be cooled and, thus, the strength of the joint is also assured even at high temperatures of the preformed body. Just as possible is the protection of sections of an aircraft exposed to icing by introducing a heated fluid into the flow conduit. For this purpose, heated cooling water of a vehicle engine, an air-conditioning system or some other assembly may be introduced into the flow conduit and the heat energy given off to the outer contour of the preformed body.

Figure 1D:
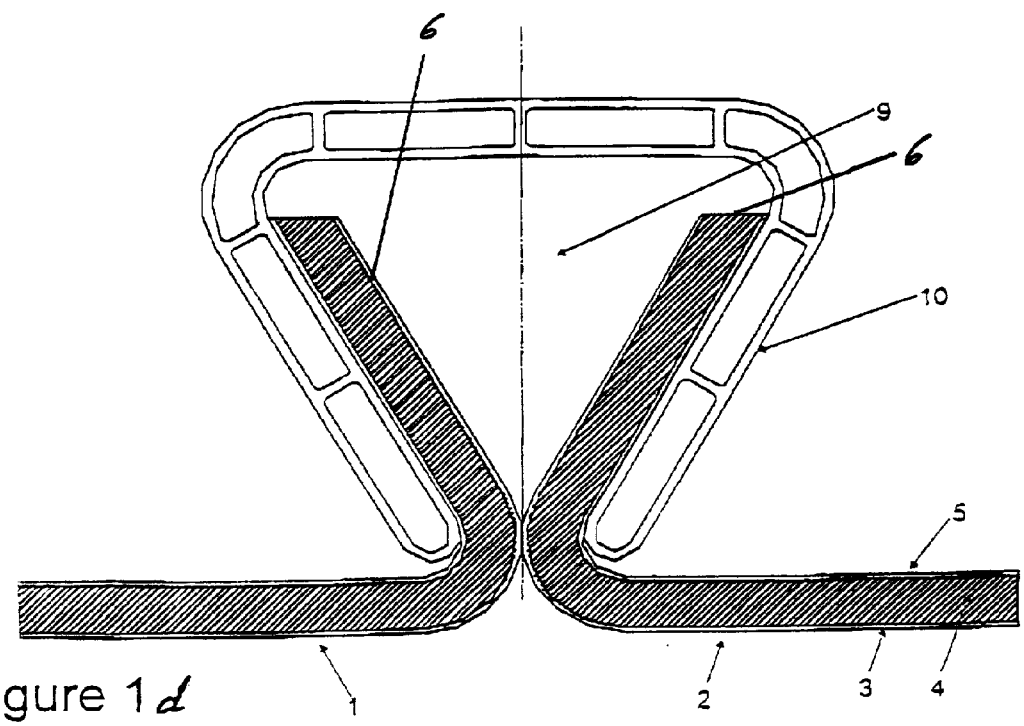
Figure 2:
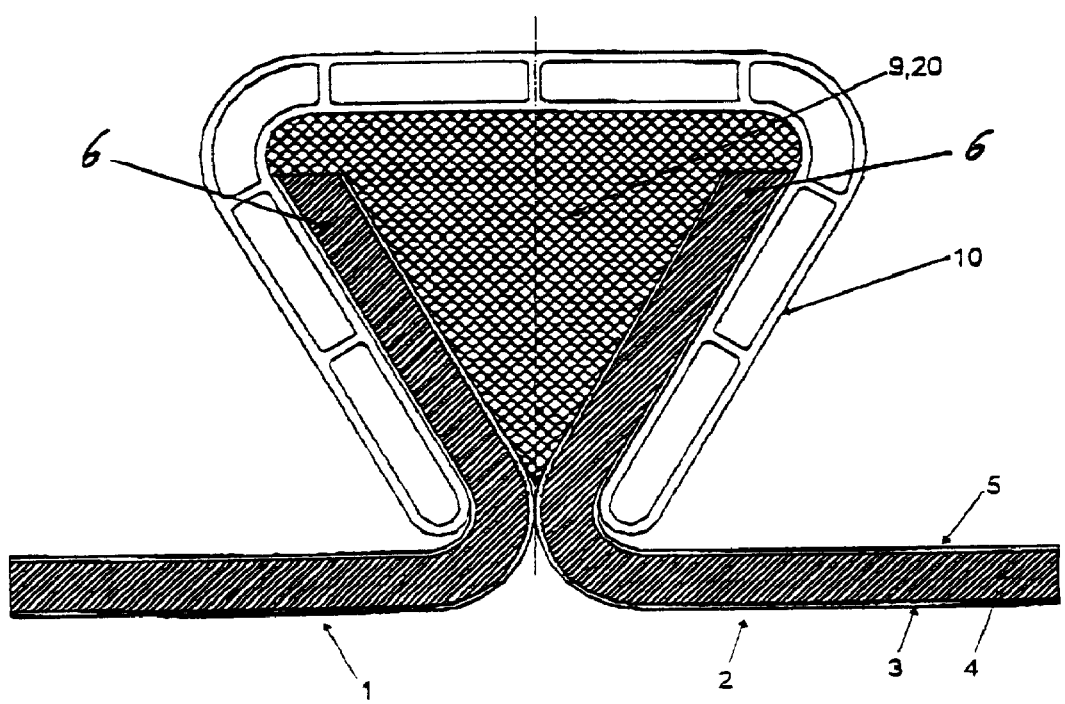
Figure 3A:
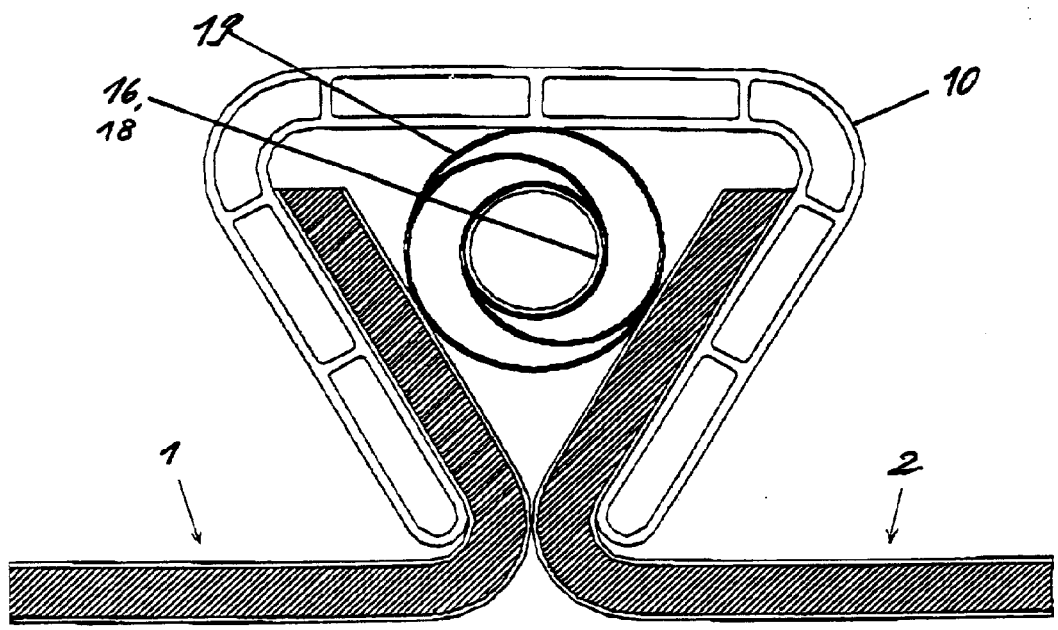
Figure 3B:
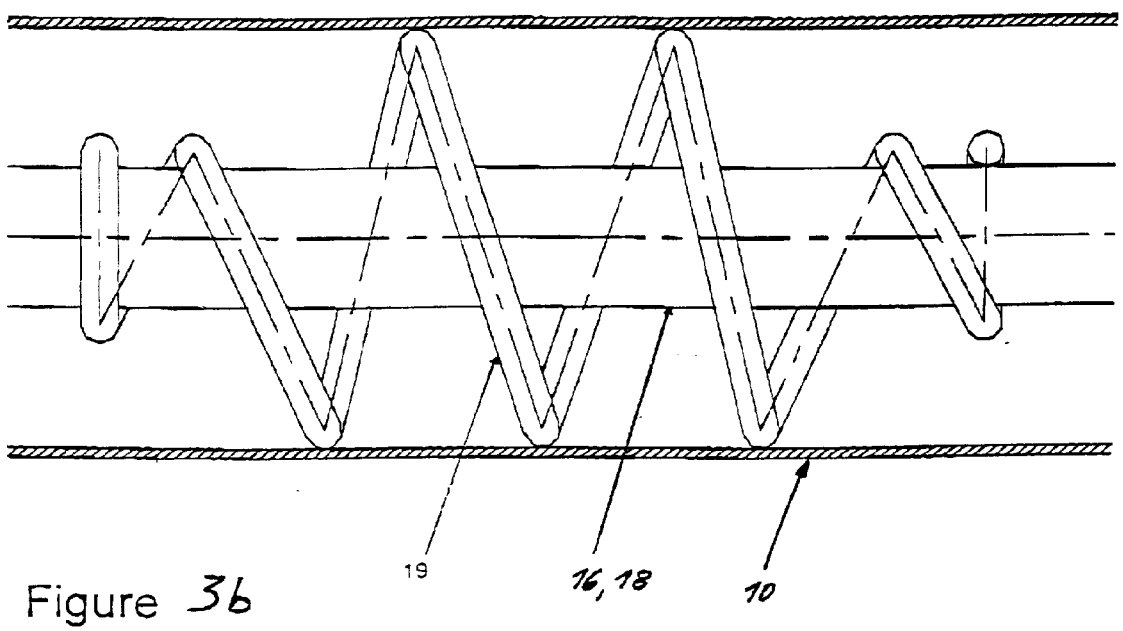
Figure 3C:
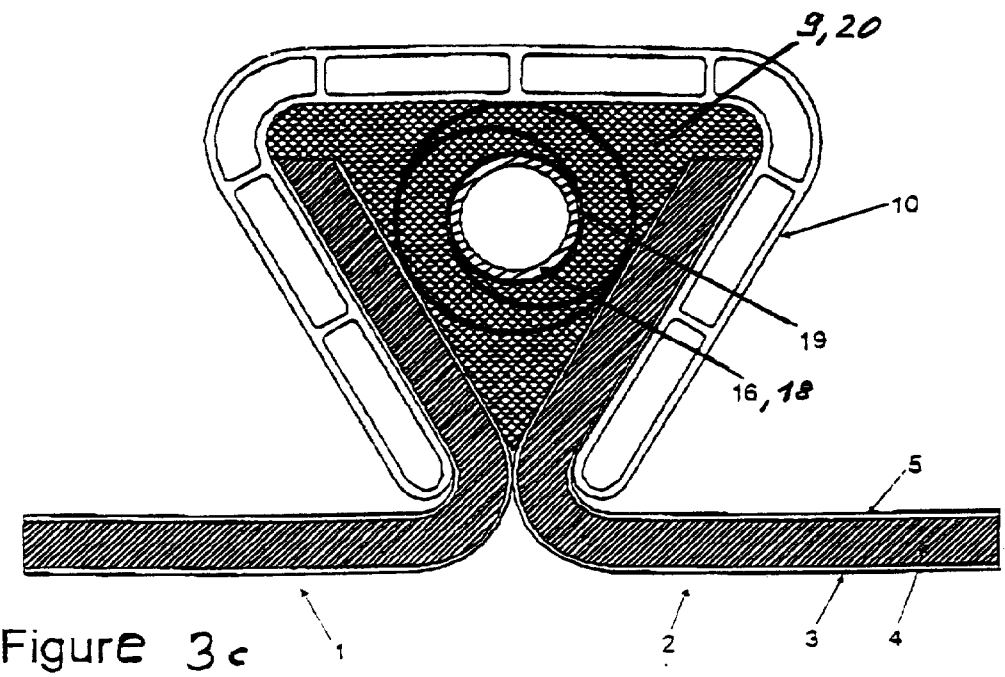
Figure 4:
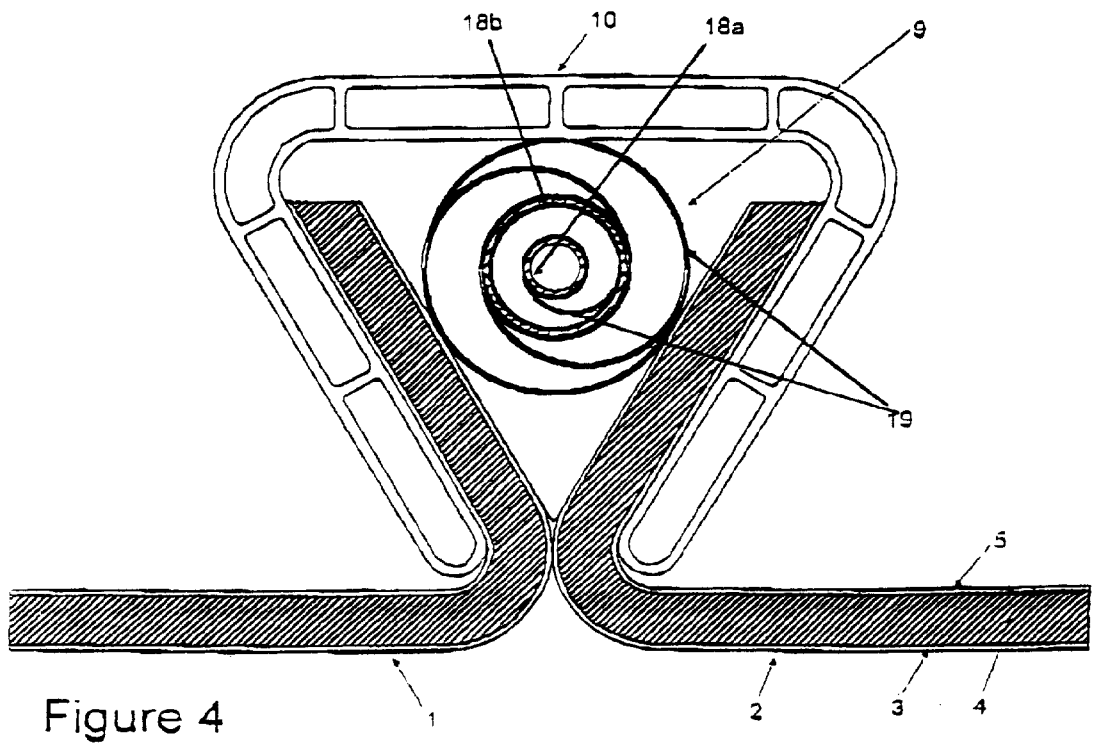
Figure 5A:
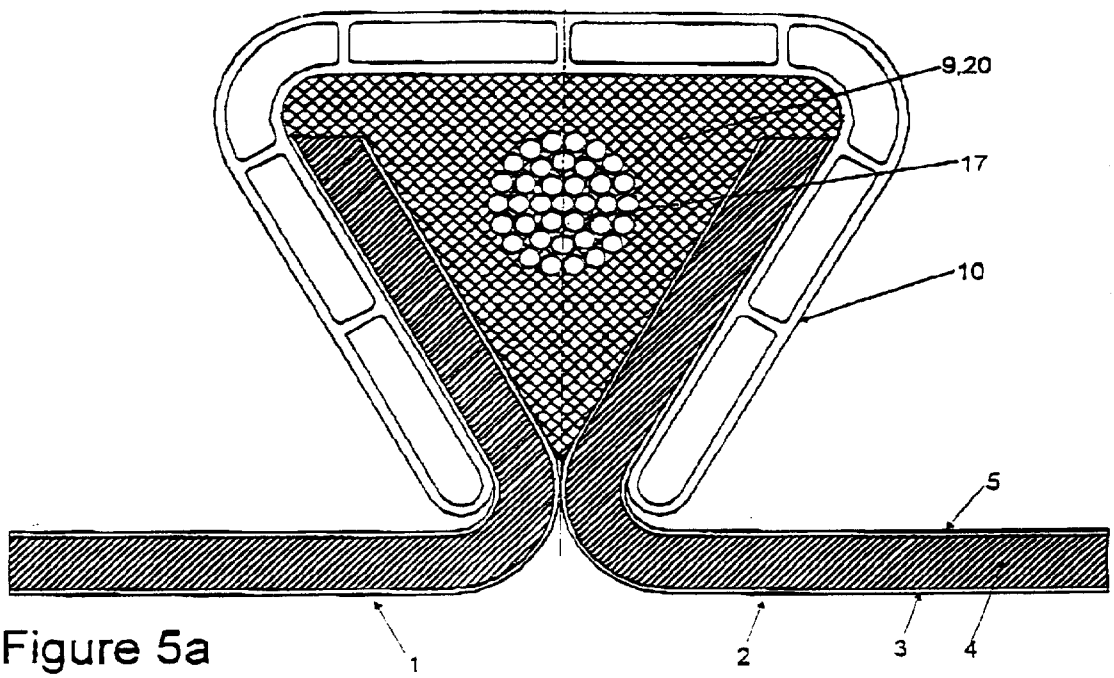
Figure 5B:
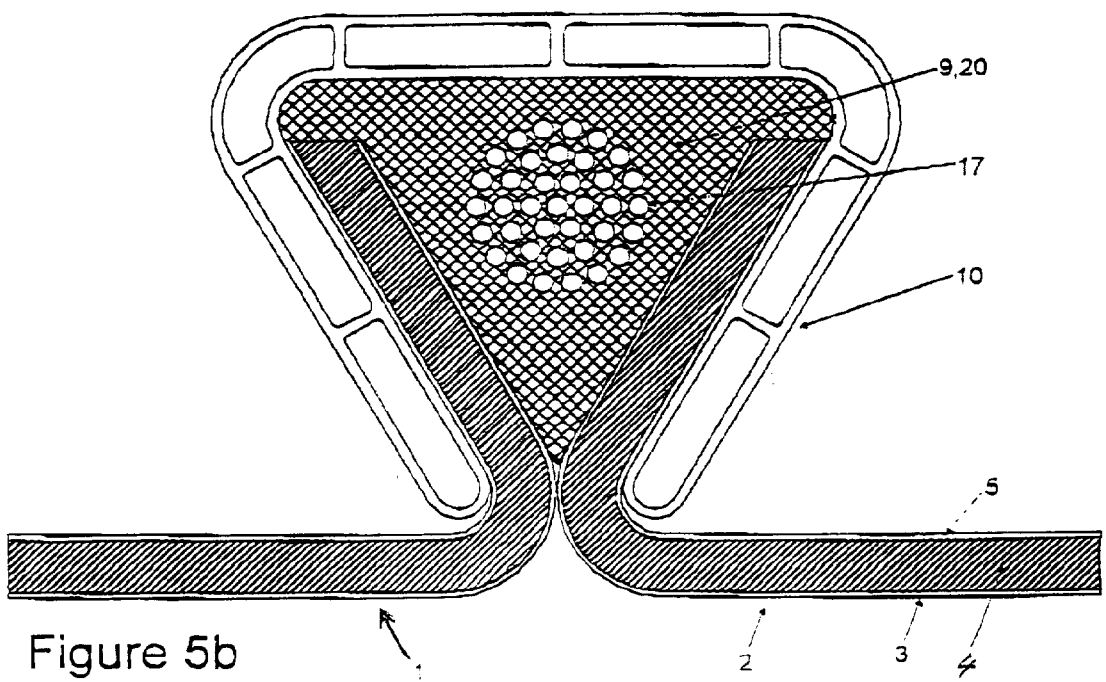
Figure 6A:
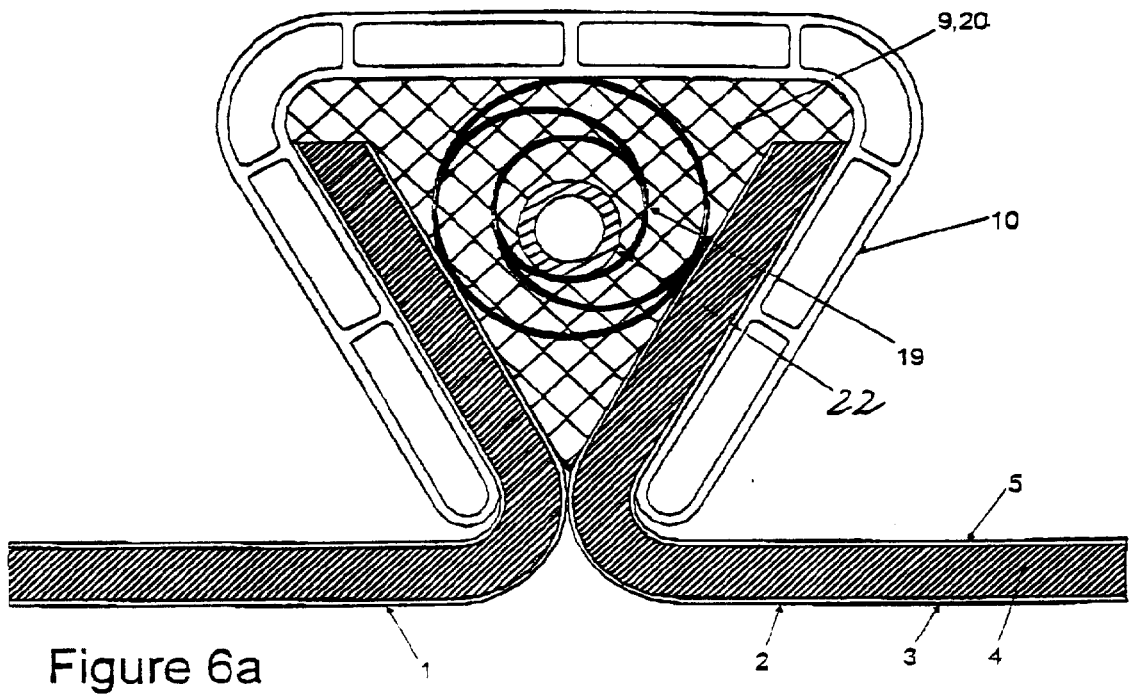
Figure 6B:
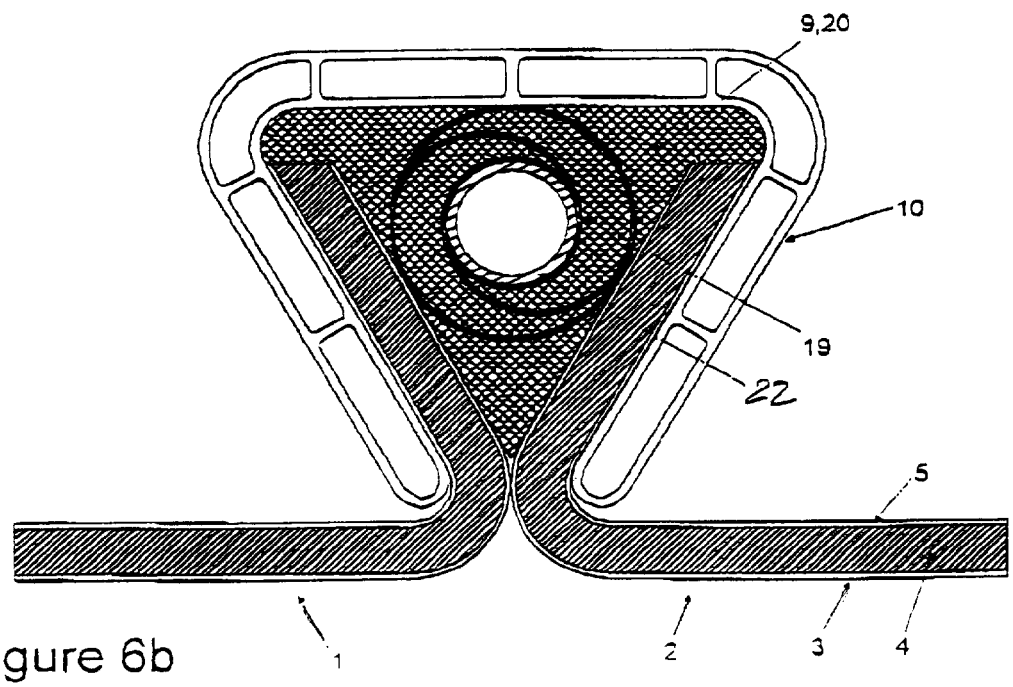
Figure 7A:
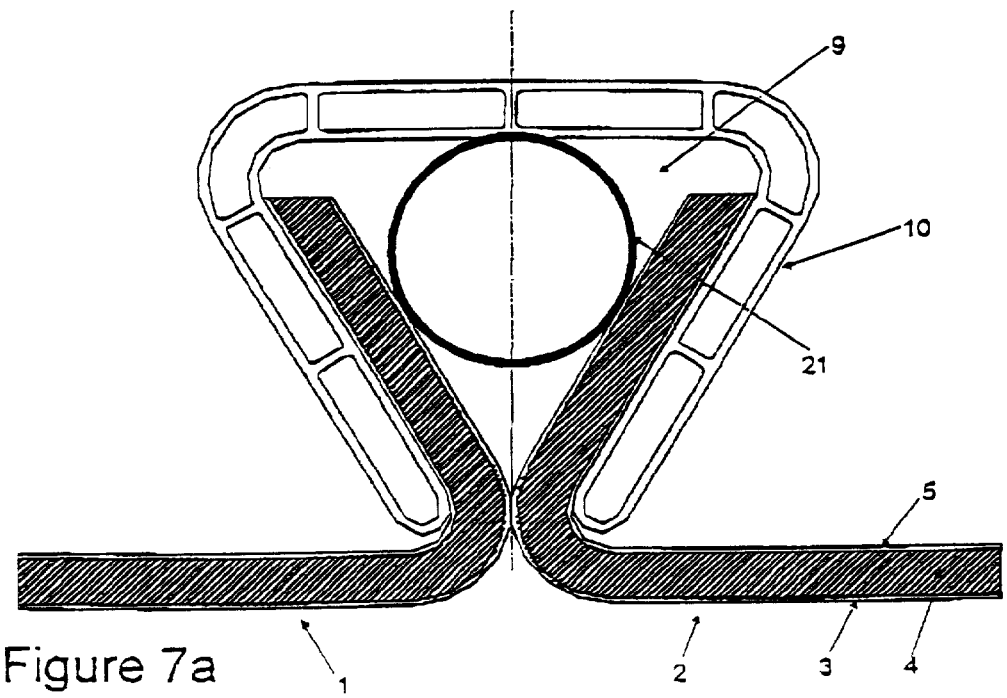
Figure 7B:
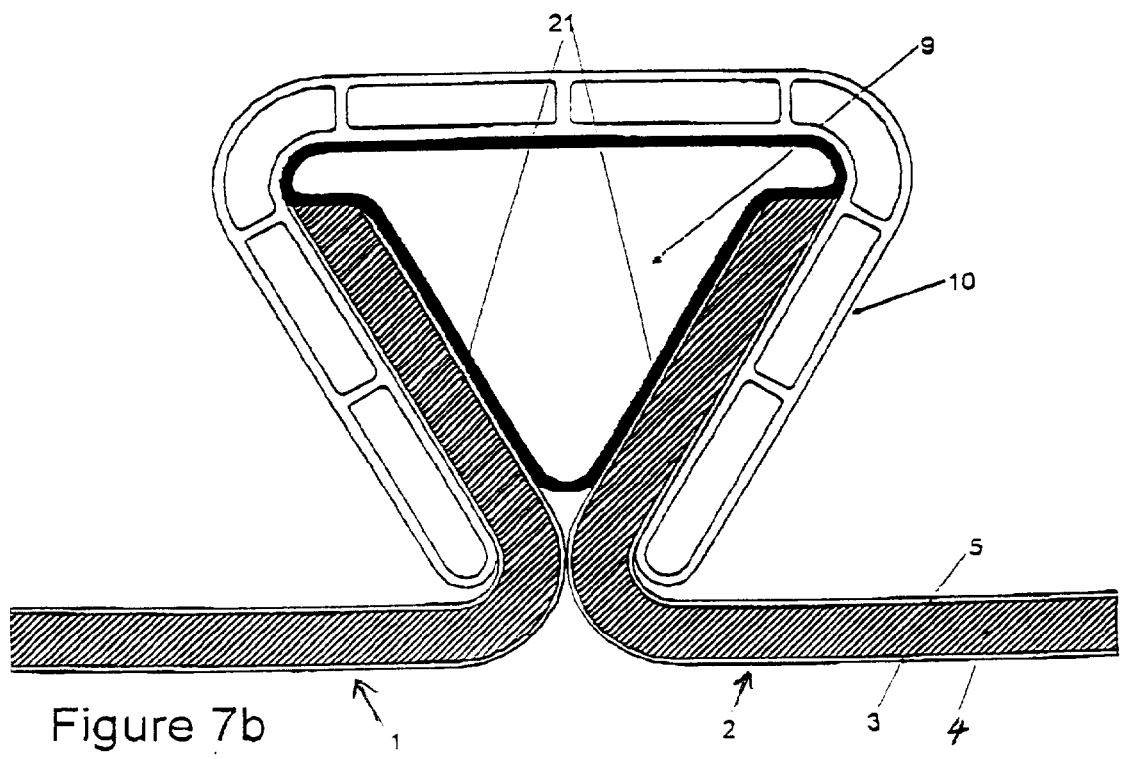
Figure 8A:
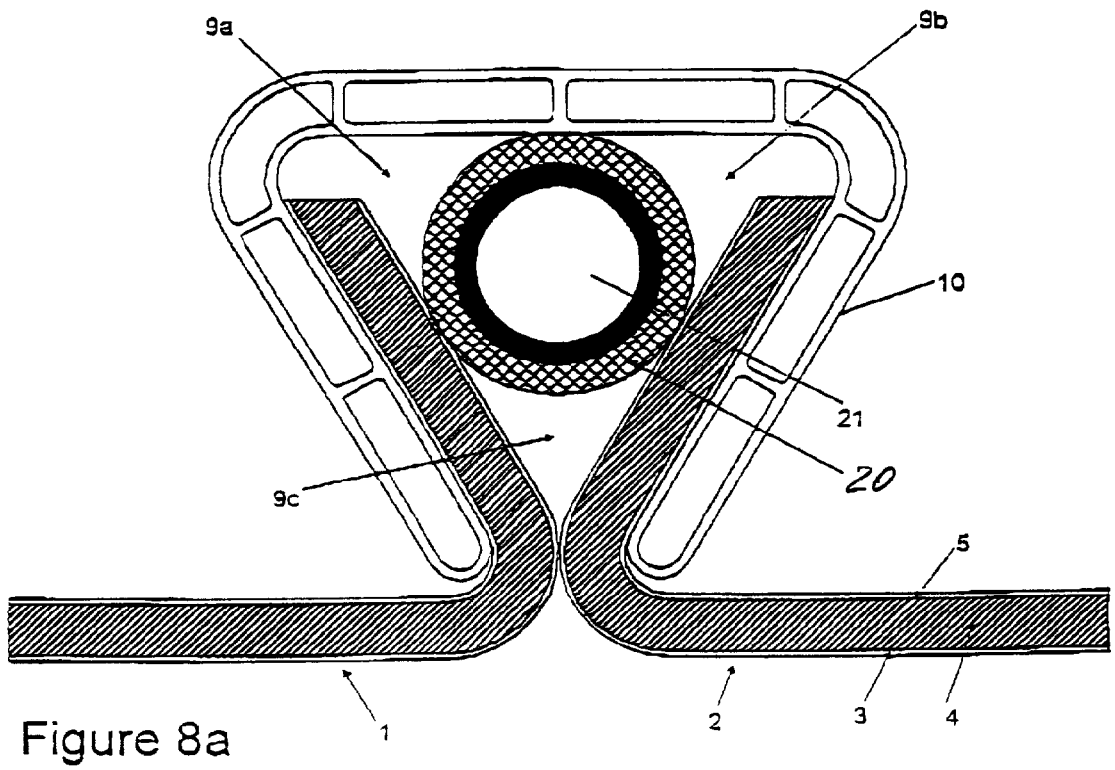
Figure 8B:
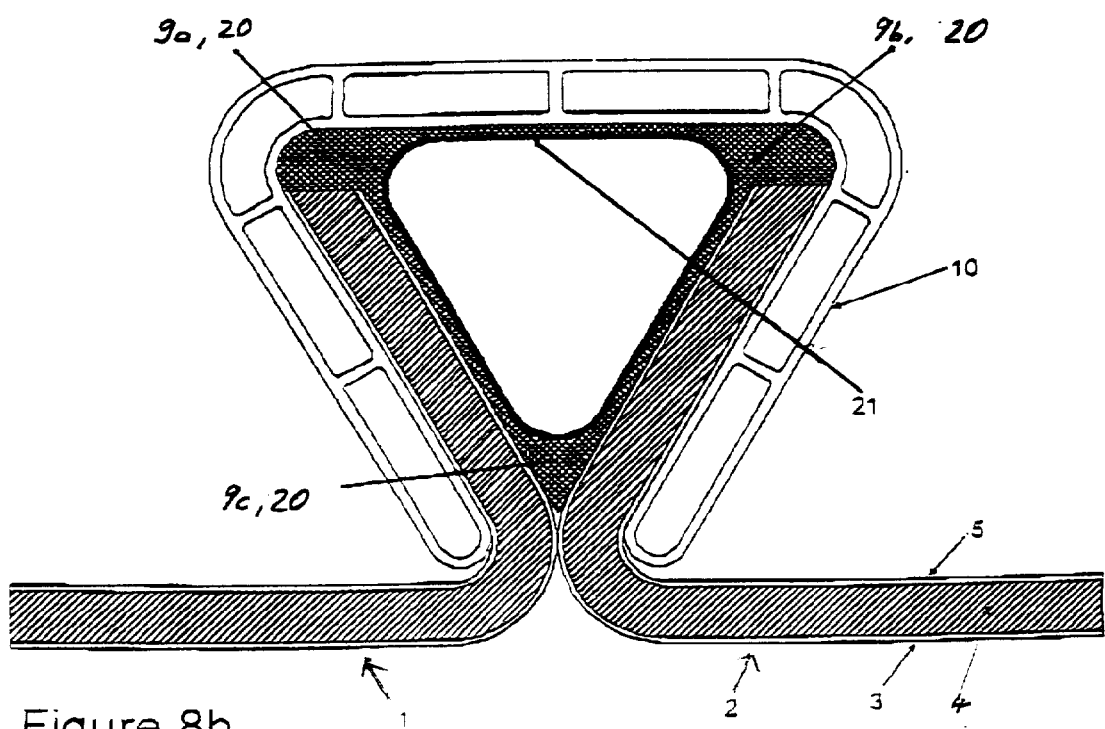
Figure 9A:
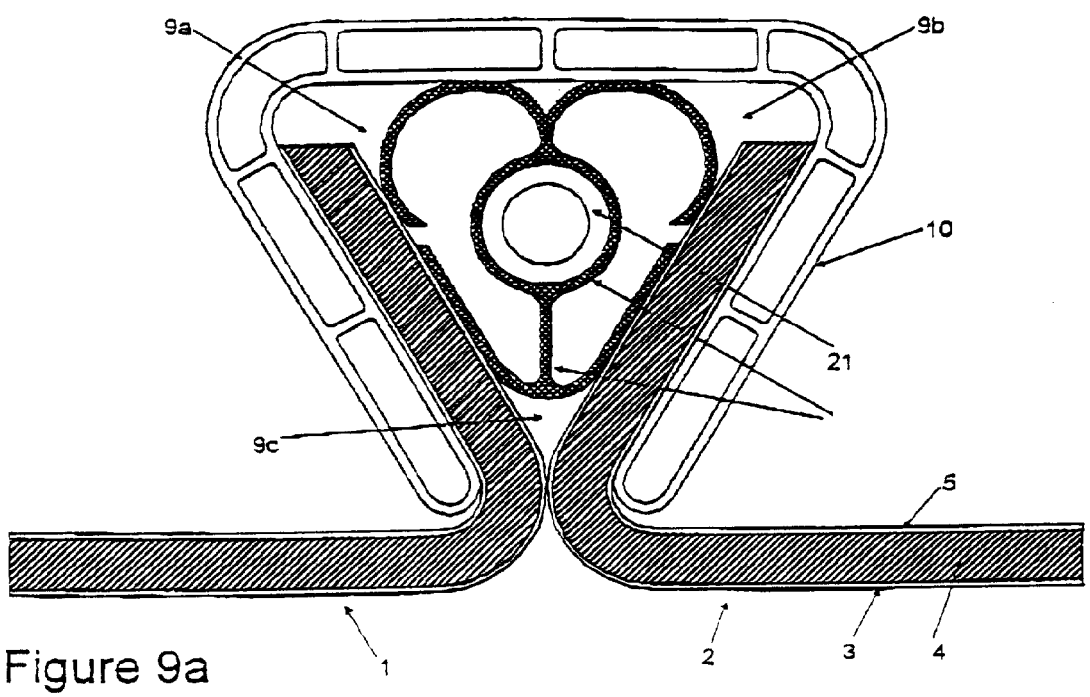
Figure 9B:
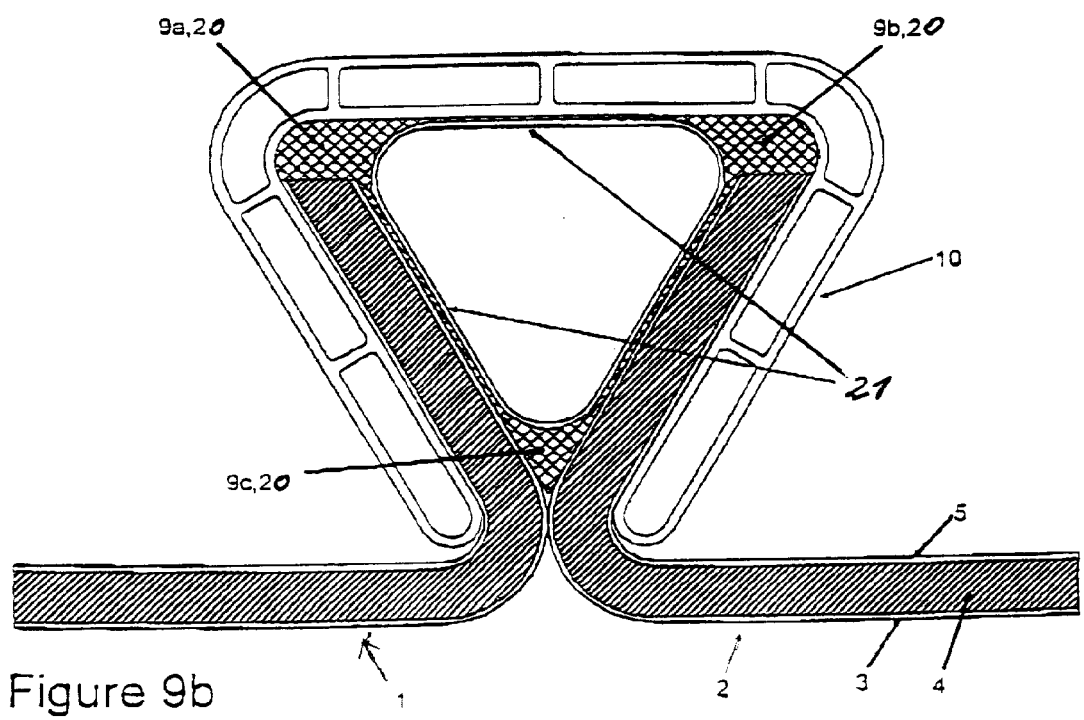
Figure 10A:
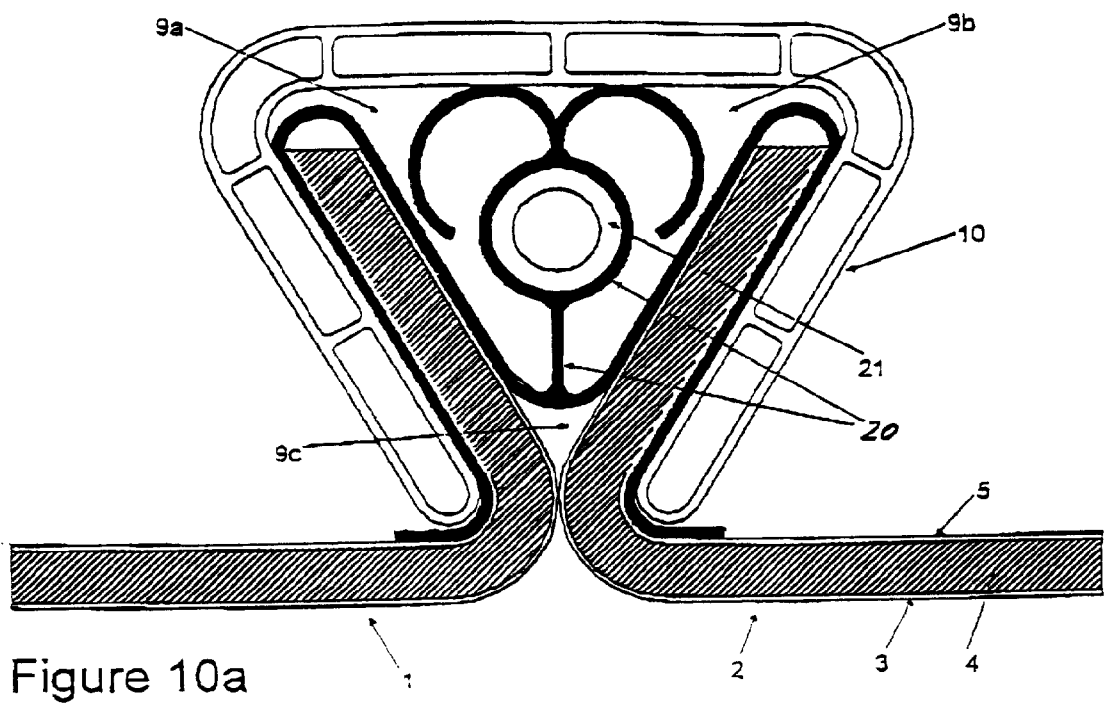
Figure 10B:
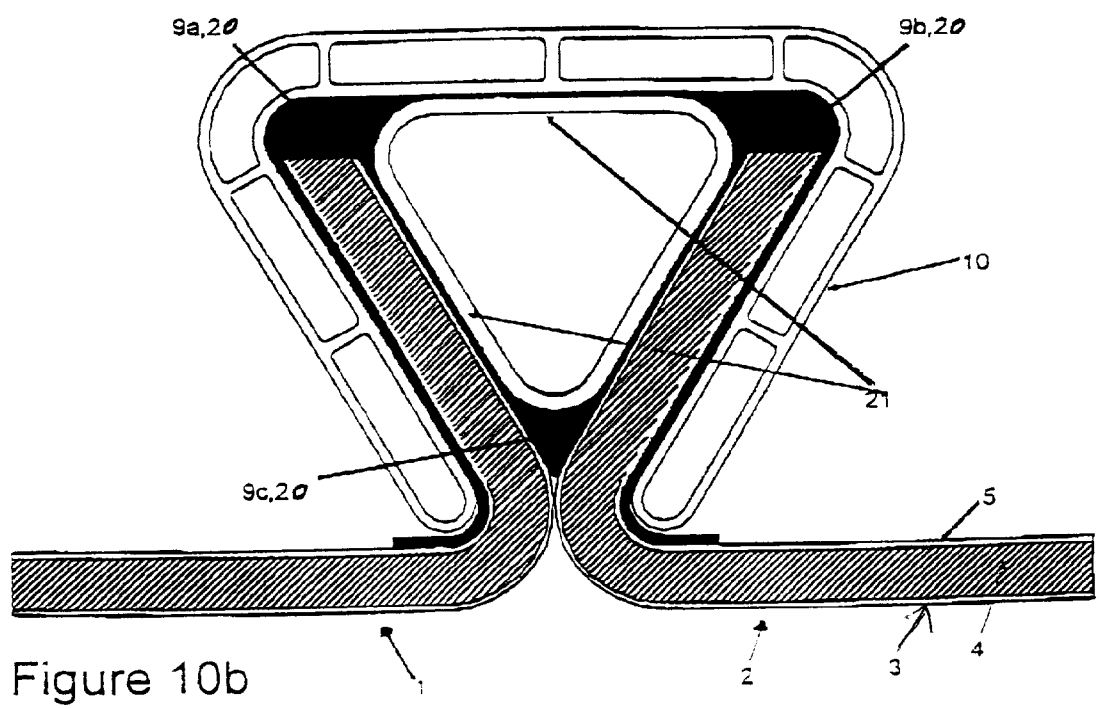
Figure 11:
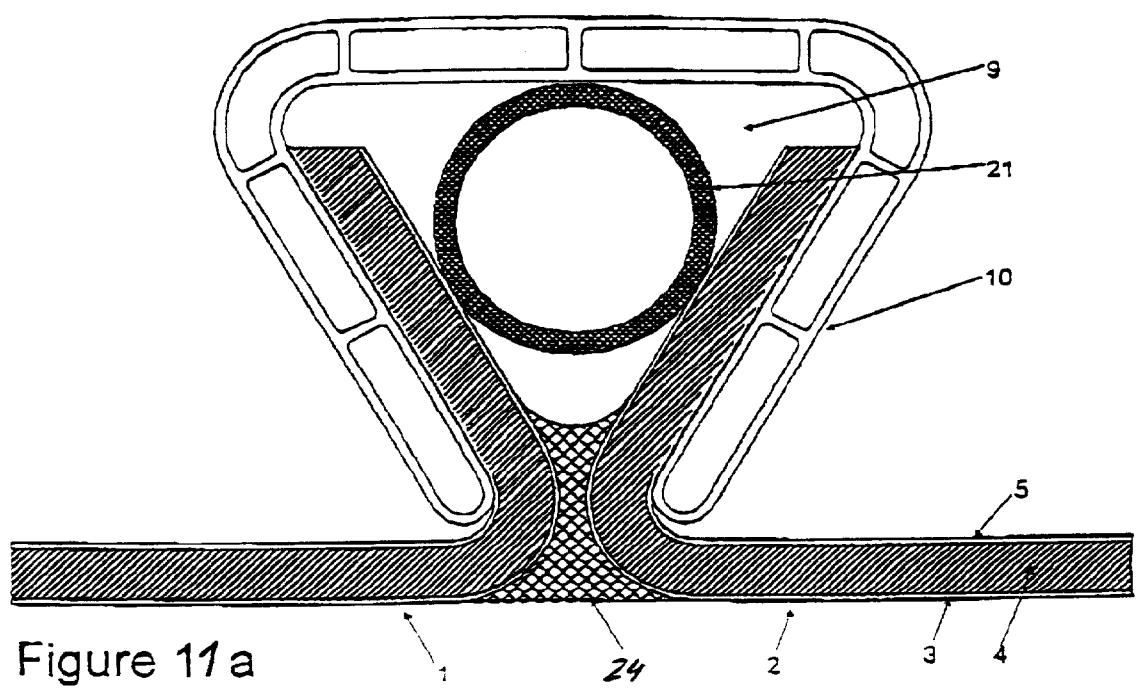
Figure 11:
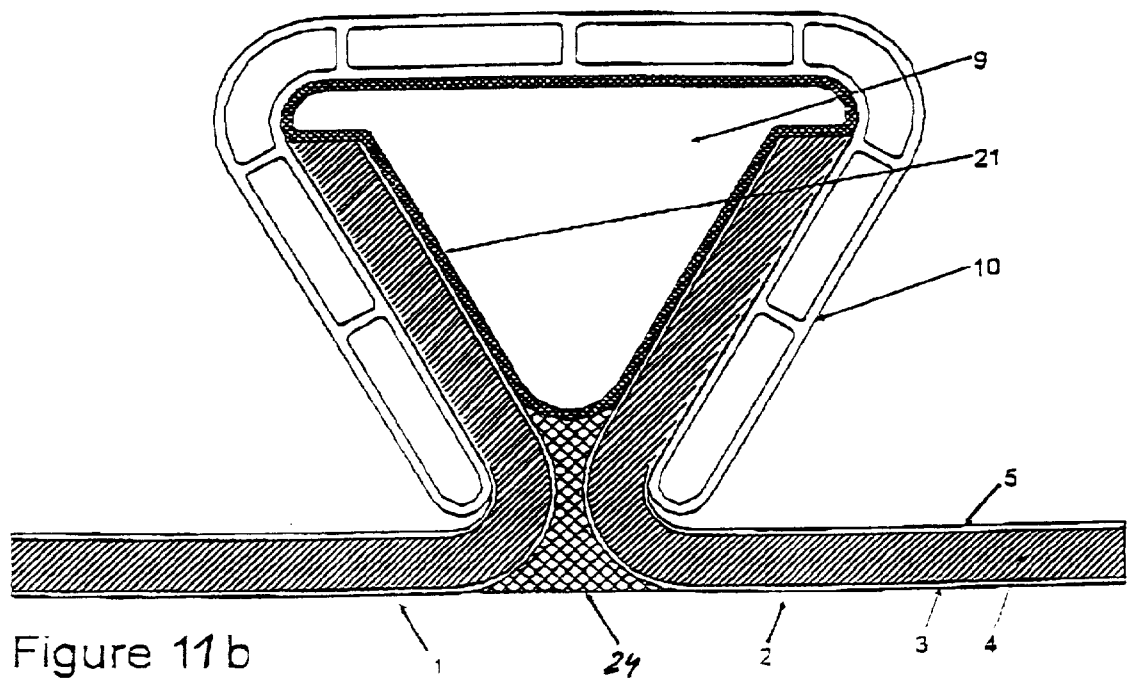
Figure 12:
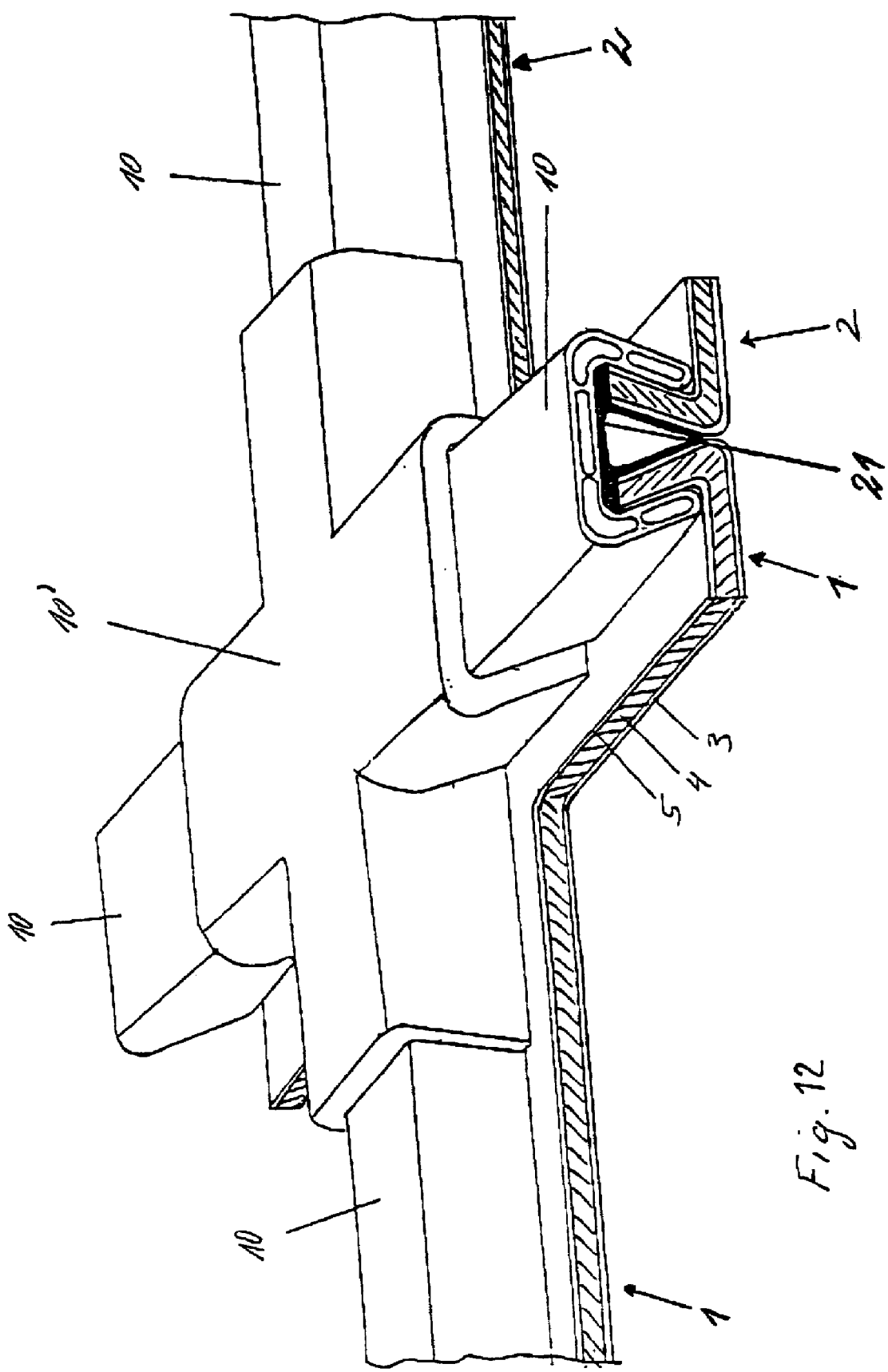
Figure 13:
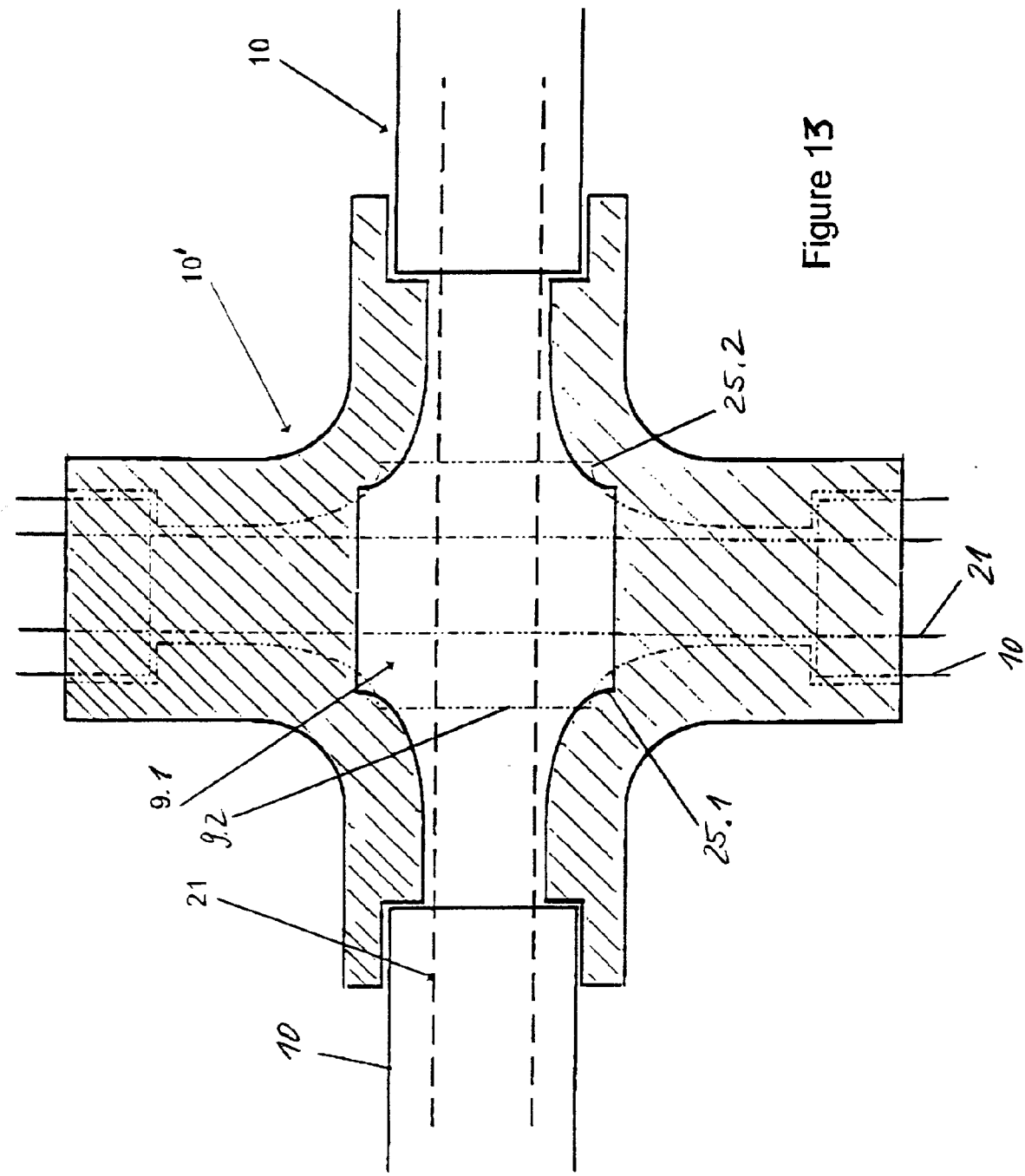
Figure 14:
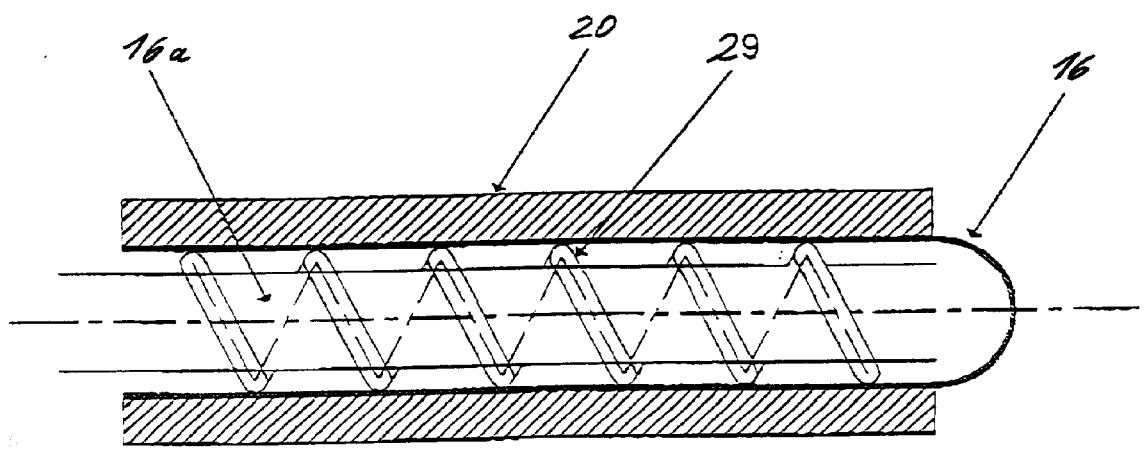

Preferred example embodiments will now be detailed with reference to the Figures in which:

FIGS. 1a–d are cross-sectional views of jointing zones of preformed bodies with jointing clamps fixed in place for a composite prior to filling the filler, FIG. 2 is a cross-sectional view of the jointing zone as shown in FIG. 1d after production of the composite, FIG. 3a is a cross-sectional view of a jointing zone in which a flow conduit is arranged for a thermal treatment means or for filling the filler, FIG. 3b is a longitudinal section view of the jointing zone as shown in FIG. 3a, FIG. 3c is a cross-sectional view of the jointing zone of FIG. 3a after production of the composite, FIG. 4 is a cross-sectional view of a jointing zone in which an expandable pressure conduit and a feeding conduit are arranged, FIG. 5a is a cross-sectional view of a jointing zone in which a fiber bundle is held tensioned, FIG. 5b is a cross-sectional view of the jointing zone of FIG. 5a after production of the composite, FIG. 6a is a cross-sectional view of a jointing zone in which an expandable pressure conduit is arranged, FIG. 6b is a cross-sectional view of the jointing zone as shown in FIG. 6a after production of the composite, FIG. 7a is a cross-sectional view of a jointing zone in which an expandable pressure conduit of a second embodiment is arranged, FIG. 7b is a cross-sectional view of the jointing zone as shown in FIG. 7a after production of the composite, FIG. 8a is a cross-sectional view of a jointing zone in which an expandable pressure conduit and a plastics profile are arranged, FIG. 8b is a cross-sectional view of the jointing zone as shown in FIG. 8a after production of the composite, FIG. 9a is a cross-sectional view of a jointing zone in which an expandable pressure conduit and a plastics profile, configured as a locating spring, are arranged, FIG. 9b is a cross-sectional view of the jointing zone as shown in FIG. 9a after production of the composite, FIG. 10a is a cross-sectional view of a jointing zone in which an expandable pressure conduit and a plastics profile, serving as a locating spring and seal, are arranged, FIG. 10b is a cross-sectional view of the jointing zone as shown in FIG. 10a after production of the composite, FIG. 11a is a cross-sectional view of a jointing zone in which an expandable pressure conduit and a closure profile are arranged, FIG. 11b is a cross-sectional view of the jointing zone as shown in FIG. 11a after production of the composite, FIG. 12 is a view of a jointing zone comprising four preformed bodies, FIG. 13 is a cross-sectional view of the jointing zone as shown in FIG. 12 and FIG. 14 is a view of a jointing zone including nested flow conduits.

Referring now to FIG. 1a, there is illustrated a cross-sectional view through a jointing zone of a first preformed body 1 and a second preformed body 2. The preformed bodies 1 and 2 are segments preformed in accordance with the later intended purpose, for example, body panels or dashboard shell structures of a motor vehicle, hull or mast segments of a marine vessel or aircraft fuselage or wing segments. For producing the preformed bodies 1 and 2 slabstock is used. The preformed bodies 1 and 2 are formed by preformed bodies of foamed metal or plastics consisting of triple laminated sections or profiles, the middle layer 4 of which is a foamed layer sandwiched between a lower and an upper solid skin 3 and 5 respectively. Instead of a sandwiched layer being foamed, a simple layer of a solid material, a honeycomb structure or some other structure could be used as the middle layer 4. It is from such a slabstock that, after parting, the preformed bodies 1 and 2 are obtained by cold or hot forming. Just as suitable are preformed bodies of fiber-reinforced plastics materials, which must not necessarily be laminates, as well as metal/plastics composites and metal/foamed plastics composites.

Configured by double folding, in particular by bending or canting, at each of the preformed bodies 1 and 2, along one of its side edges, is a joining section 6. Such a joining section 6 in the form of a flared edge comprises a first web 7, jutting from the corresponding preformed body 1 and 2 respectively, and a second web 8 adjoining thereto, folded back to the same preformed body. In the example embodiment, the second web 8 runs parallel to, and spaced away from, the end portion of the corresponding preformed body 1 and 2 respectively located below.

To produce a composite of preformed bodies, the preformed bodies 1 and 2 are located and locked in place with their joining sections 6 abutting. Subsequently, a jointing clamp 10 is applied so that the abutting joining sections 6 are clasped by the jointing clamp 10. The jointing clamp 10 is formed by a tubular cylindrical section of square cross-section from hollow chamber material, which, in its longitudinal direction, is opened up by the straight slit 12 extending continuously from one face to the other.

The jointing clamp 10 may be configured as a hollow extruded section. It may also be produced from slabstock, cut into a rectangular shape and cold formed into the tubular cylindrical section, for example, bent or rolled. However, it is just as possible to produce it from a tubestock by machining the slit 12 or as a preformed part. The jointing clamp 10 is fabricated preferably of metal or a solid plastics material.

After lay-up, the jointing clamp 10 clasps the two abutting joining sections 6. The longitudinal edges of the jointing clamp, defining the slit 12, locate on both sides of the joining sections 6 in the region of the first webs 7. The second webs 8, facing away from each other, locate in the region of a space 9 encased by the tubular cylindrical section of the jointing clamp 10, the webs 8 being located opposite to legs 13a of the clamp. The jointing clamp 10 is pushed into place lengthwise on the joining sections 6 since its tubular cylindrical section is not deformable. The tubular cylindrical section is engineered sufficiently inherently rigid for performing the shell and clamping function involved as needed for the composite when later foamed with a foam material or filled with a plastics material.

The jointing clamp 10 is held in the location as shown, in which it encases the jointing zone with the two joining sections 6 like a shell. In the example embodiment, the second webs 8, facing away from each other, and one surface of the preformed bodies 1 and 2 form a support for the jointing clamp 10. However, in principle, the jointing clamp 10 may also be provided with a slight elasticity so that it already clamps and locates the two preformed bodies 1 and 2 in the shown starting position, more particularly, by it pressing the webs 7 against each other in the region of the slit 12 of the jointing clamp 10. It would also be possible when the preformed bodies 1 and 2 and the jointing clamp 10 are correspondingly adapted in shape, to positively retain the jointing clamp 10 in the desired position for the composite, i.e. riding the preformed bodies 1 and 2 or their joining sections 6.

FIGS. 1a to 1d illustrate variants in form of the jointing clamp 10 including the corresponding joining sections 6 of the preformed bodies 1 and 2.

The joining sections 6 of the example embodiment of FIG. 1d in the case of metal foam preformed bodies are formed by single folding or bending parallel to a longitudinal edge of each of the preformed bodies 1 and 2. The longitudinal edges of the preformed bodies 1 and 2 are bent by more than 90° and thus bent back to the corresponding preformed body, resulting in a v-shaped inner edge portion. To adapt to this pair of joining sections, the jointing clamp 10 comprises a tubular cylindrical section which, in cross-section, has a tubular triangle shaped section, the triangle being cut off or open at a tip to form a longitudinal slit 12. Once the jointing clamp 10 has been pushed into place over the joining sections 6 of the preformed bodies 1 and 2, this arrangement has the shape of a dovetail joint in the jointing zone. The same shape of the joining sections 6 is likewise of advantage in preformed bodies of other materials.

Referring now to FIG. 2, there is illustrated the jointing zone of the composite of preformed bodies of FIG. 1d after filling the filler 20 into the encased space 9, i.e. into the free cavity formed by the clamping action of the jointing clamp 10. The filler 20 may be foamable plastics material, synthetic resin, synthetic resin with reinforcement material or another plastics material, for example a prefabricated plastics profile, whereby the encased space 9 is totally filled and in the encased space a compressive force is exerted on the joining sections 6 accommodated by the jointing clamp 10. The preformed bodies 1 and 2, as shown in the example embodiment of FIG. 2, are positively and non-positively held in contact by means of the jointing clamp 10.

Referring now to FIG. 3a, there is illustrated a jointing zone including the preformed bodies 1 and 2 and the jointing clamp, as shown in FIG. 1d, prior to filling the plastics material. A flow conduit 16 is located centered in the encased space 9 by means of an elastic spacer 19. FIG. 3b shows part of the jointing zone in a longitudinal section.

The spacer 19 is a helical spring wound around the flow conduit 16 at a distance and is slidingly guided at both ends on the flow conduit 16. Before being inserted into the encased space, the diameter of the spacer 19 is larger than the diameter of an inscribed circle applied to the delimitation of the encased space 9. The flow conduit 16 may be made of a flexible or solid material. It may be closed or perforated. The spacer 19 may be made of plastic or metal.

The shape of the spacer 19 is of advantage for a later filling with a plastics material, it being stretchable and upsettable in the longitudinal direction of the flow conduit 16, thus enabling its diameter to be altered. It is further bendable. If the jointing clamp 10 and the preformed bodies 1 and 2 are shaped, then this shape of the spacer 19 is particularly favorable since the spacer 19 does not obstruct jointing by retaining its shape, it instead adapting accordingly. The spacer 19 adapts itself to the cross-section of the encased space 9 including bends.

Referring now to FIG. 3c, there is illustrated the jointing zone after production of the compacted composite. The flow conduit 16 is surrounded by a hot-curing resin 20 which is filled into the encased space 9 pressurized to fill it out totally. The encased space 9 is designed via a suitable connecting system as a closed system, into which fluid resin is pumped until all areas of the encased space 9 are filled with the resin 20. Once the encased space 9 has been filled with the hot-curing resin 20, thermal treatment fluid, which has been heated to the curing temperature of the resin 20, is pumped through the flow conduit 16. The thermal treatment fluid is preferably a thermal oil. Thermal treatment is continued until curing of the resin 20 is assured throughout.

In a preferred embodiment, instead of a resin by itself, a resin blended with a reinforcement material such as, for example, glass chips, carbon chips, kevlar fiber chips or glass balls may be filled into the encased space 9 and cured as described above.

It is just as possible to insert into the encased space 9 a bundle of fibers or a preformed fiber composite body of fibers of glass, carbon, aramide or metal, adapted to the cross-section of the encased space 9, or other suitable fibers. In a next step, the fiber bundle or the fiber composite is impregnated by a compatible resin blend being pumped through. In a subsequent step, the resin is cured as described previously. If a fiber bundle, a fiber composite or some other reinforcing structure of an expanded geometry is inserted, the reinforcing structure may support the flow conduit thus eliminating the need for a separate spacer.

Instead of being used for thermal treatment, the flow conduit may be used to impregnate a fiber bundle or fiber composite, inserted in the encased space 9, with a suitable synthetic resin. In this application, it is then termed feeding conduit 18. A perforated feeding conduit 18, for instance, is configured such that the resin seeps uniformly through the perforation. However, it is just as possible to arrange for an irregular seepage by suitably configuring the feeding conduit 18 in order to compensate for cross-sectional changes of the encased space 9, for example.

The encased space 9 is sealed off tight at one end. The resin is pumped through the feeding conduit 18 by means of a rotary flexible pump. The feeding conduit 18 must not necessarily be perforated, it may also be formed by a straightforward tube having a dense sheath and an open end at the closed-off end of the cavity. By means of the pump, the suction intake is made at the open end of the encased space 9 and a vacuum is created. Such a closed-circuit system is continually vented by the suction action. Pumping and sucking in is continued until the encased space 9 is totally filled.

If a hot cross-linking resin is used for this process, the thermal energy needed is brought in from outside, for example by heating cuffs, or from within by means of a thermal treatment means having a flow conduit for a thermal treatment fluid. Referring now to FIG. 4, there is illustrated a jointed composite with two nested conduits 18a and 18b.

This arrangement is used to implement consolidation of engineered resins in the encased space 9 by tailoring pressure and temperature to the requirements of the resin. A flexible perforated outer flow conduit 18b is utilized as the material feeding conduit analogous to the previously described example embodiment and a flexible inner flow conduit 18a is employed as the pressure conduit. Once the encased space 9 has been totally filled, the pressure conduit 18a is charged with an overpressure to the feeding conduit 18b and the encased space 9. It may also be pressurized to assist filling. Heating elements are arranged around the outer contour of the jointing clamp 10. With this arrangement it is possible to cycle the pressure and temperature reproducibly and thus to optimize the compacted composite cost-effectively by means of preferably incorporated high capacity composites such as, for example, carbon fiber epoxy resin blends or prepregs.

FIG. 5a illustrates two preformed bodies 1 and 2 and a jointing clamp 10 positively connected to each other. An interwoven, tensile stressed, reinforcement fiber bundle 17 is inserted into the encased space 9. Upon stress relief of this fiber bundle 17, its cross-sections increases. It preferably fills out the cross-sections of the cavity 9 to a major extent upon tension release. Stress relief of the fiber bundle 17 is of advantage for filling the remaining encased space 9 with a flowable filler 20, preferably synthetic resin, by means of pressure and marrying the individual fibers of the fiber bundle 17 in a non-positive fiber/resin matrix.

Marrying a reinforcing structure, as is the fiber bundle 17, is of advantage since this makes it possible to utilize the so-called zero position for introducing and accommodating forces in the composite of preformed bodies. Thus, it is particularly from such fiber bundles at the emergence points from the composite of preformed bodies that lugs can be formed with which the composite of preformed bodies can be lifted for example for transport purposes, or which form the lashing points in later use of the composite for the introduction of external forces.

Referring now to FIG. 5b, there is illustrated the fiber filament bundle 17 after relaxation of the tensile stress and expansion resulting thereof. The fiber bundle 17 is totally impregnated by the filler 20. After curing, the fiber bundle 17 is non-positively connected to the composite of preformed bodies.

FIG. 6a illustrates a jointing zone in which the encased space 9 is filled with a non-compacted blend 20 of fluid resin and reinforcement material. Prior to filling the blend 20, a communicating, expandable pressure conduit 22 is inserted into the encased space 9 by means of a spacer 19. The spacer 19 is designed so that it leaves enough room for expansion of the flow conduit 16 also in the region where its diameter is narrowest to permit overall compacting of the resin/reinforcement material blend 20, loosely packed in the encased space 9. The reinforcement material is formed by a particulate filler.

Referring now to FIG. 6b, there is illustrated the composite of preformed bodies after expansion of the pressure conduit 22 by it being pressurized, the expansion compacting the blend 20. The result is a compacted, solid plastics material 20 totally filling out the encased space 9 and thus producing a solid compacted composite. For consolidation the pressurizing fluid is heated, or hot pressurizing fluid is directly communicated through the pressure conduit 22.

Referring now to FIG. 7a, it illustrates a communicating pressure conduit 21 of cold or semi-cold formable metal which is brought into the encased space 9 to form the filler. The wall thickness and diameter of the pressure conduit 21 are dimensioned so that adequate material exists for expansion to ensure that the pressure conduit 21 does not burst on expansion for lack of sufficient material substance. The jointing clamp 10 and the preformed bodies 1 and 2 form, by means of the encased space 9, a form tool for the pressure conduit 21 to be expanded.

FIG. 7b illustrates the pressure conduit 21 after having been expanded by means of the internal pressure of a cold or semi-cold fluid. The pressure conduit 21 urges positively against the inner contour of the encased space 9 so that a solid, positive and non-positive connection of the preformed bodies 1 and 2 materializes via the jointing clamp 10 and with the aid of the pressure conduit 21. The preformed bodies 1 and 2, the jointing clamp 10 and the reshaped pressure conduit 21 form the compacted composite of preformed bodies.

Referring now to FIG. 8a, there is illustrated a modification of the arrangement as shown in FIG. 7a. Here again, in the encased space 9, a pressure conduit 21 of a cold or semi-cold formable metal is arranged. In this example embodiment, however, a profile of a thermoplastic material, sheathing the pressure conduit 21, is inserted into the encased space 9 as the further filler 20. However, the thermoplastic profile 20 may, in principle, assume any other shape permitting insertion into the encased space 9.

A thermal treatment fluid is communicated by the pressure conduit 21 which is thus heated to the melting temperature of the thermoplastic profile 20 and then expanded by pressurizing the thermal treatment fluid. In this phase of the jointing procedure, the melted material of the thermoplastic profile 20 surrounds the expanded pressure conduit 21 as a fluid in the encased space 9 due to the hydrostatic equilibrium. The melted, thermoplastic material 20 is pressed through the expanding pressure conduit 21 into the remaining cavities 9a, 9b and 9c in the encased space 9 to thus seal off the encased space 9.

On maintenance of the pressure in the pressure conduit 21, the hot fluid in the pressure conduit 21 is replaced by a cold fluid. The expanded pressure conduit 21 and the thermoplastic material 20 are cooled to room temperature and consolidate, thus resulting in a compacted, sealed composite of preformed bodies. The composite of preformed bodies is represented in FIG. 8b.

Referring now to FIG. 9a, there is illustrated a further development of the previous example embodiment. In this case, the inserted thermoplastic profile 20 fulfills functions in addition to those described above. The thermoplastic profile 20 simultaneously fulfills the function of a spacer holding the pressure conduit 21 in the desired position. On the other hand, the thermoplastic profile 20 fulfills the function of a locating spring which by itself already suffices to maintain the preformed bodies 1 and 2 and the jointing clamp 10 in the desired position.

FIG. 9b illustrates the composite after compacting which is done in the same way as in the method of the example embodiment of in FIGS. 8a and 8b.

FIG. 10a illustrates a further preferred embodiment of a thermoplastic profile 20. In this case, the injected thermoplastic material has, in addition to the functions described in the context of FIGS. 8 and 9, the further function of corrosion protection. This is achieved in that the thermoplastic profile 20 is brought out of the encased space 9 through the slit 12 of the jointing clamp 10 and covers the inner portions of the bending radii of the joining sections 6. The thermoplastic profile 20 forms a parting layer between the jointing clamp 10 and the preformed bodies 1 and 2.

FIG. 10b shows the composite after compacting, which is done analogous to the method as described for the example embodiments of FIGS. 8 and 9. The thermoplastic profile 20 forms a blocking layer between the jointing clamp 10 and the preformed bodies 1 and 2. Due to the good insulating properties of the thermoplast, contact corrosion can thus be avoided. Shaping the thermoplastic profile 20 simultaneously as a corrosion protection profile enables materials to be used together, such as stainless steel and aluminum, which in combination would normally pose corrosion problems. It also prevents the ingress of media having good electrical conductivity into the composite of preformed bodies which would, otherwise, create galvanic currents which, in turn, prompts corrosion of dissimilar metals.

Referring now to FIGS. 11a and 11b, there is illustrated a further development of the example embodiment of FIGS. 7a and 7b which, however, may be used likewise in all example embodiments. In the jointing zone, a closure profile 24 is inserted in a gap in the abutting portion of the preformed bodies 1 and 2 to seal off the gap. The closure profile 24 compensates irregularities which may result from employing preformed bodies 1 and 2 differing in wall thickness. It also compensates a cavity on the side of the composite of preformed bodies opposite the jointing clamp 10.

The surface areas of the closure profile 24 facing the preformed bodies 1 and 2 or the joining sections 6 are a negative image of the contours of the preformed bodies 1 and 2. In the encased space 9, the closure profile 24 terminates in thin-walled lips in snug contact with the inner walls of the encased space 9 formed by the joining sections 6. On the side facing away from the encased space 9, the closure profile 24 follows the contour of the preformed bodies 1 and 2 facing away from each other until it has attained the level of the surface intended for the composite of preformed bodies. It is due to the closure profile 24 that a smooth surface is produced to the outer contour opposite the encased space 9.

Should no plastics materials be used in compacting the preformed body composite, as in the example embodiment illustrated, there is direct contact between the expanded flow conduit 21 and the closure section 24. When both the flow conduit 21 and the closure section 24 are made of metal, thermal energy, having good thermal conductivity to the side of the composite of preformed bodies opposite the jointing clamp 10, can be removed from the jointing zone.

Referring now to FIG. 12, there is illustrated a cross-type composite of four preformed bodies 1 and 2, the joint in accordance with FIGS. 7a and 7b existing between each two pairs of adjoining preformed bodies 1 and 2. In the illustration, the jointing clamp 10 of FIG. 1d, standing for other jointing clamps, is again used in producing each of these joints. Reference is accordingly made to the description of the example embodiment of FIGS. 7a and 7b with regard to the paired jointing of preformed bodies 1 and 2. Each of the single joints may be also formed alternatively by the joint of any of the other example embodiments.

In a common intersection are four preformed bodies with their side edges oriented abutting and located relative to each other in this position as desired for the cross-type composite shown. A cross-type jointing clamp 10' fulfills the function of a bridging element clasping all jointing clamps 10. The bridging element 10' comprises four legs protruding upright from a middle portion of the bridging element 10'. The bridging element 10' may be composed of one piece or of several parts connected to each other, for example, by welding, bolting or by some other suitable means. Each of the legs of the bridging element 10' comprises crosssectionally in an inlet portion the shape of the jointing clamp 10 of the example embodiment of FIG. 1*d*.

Referring now to FIG. 13, there is illustrated a section through the interior of the bridging element 10'. The bridging element 10' comprises four inlet portions into each of which one of the jointing clamps 10 protrudes. Each of the pressure conduits 21 is received in an intersection of the bridging element 10' separate from each other. In the example embodiment, two of each of the pressure conduits 21 of the individual jointing zones are located in alignment with each other and are formed by a single, continuous pressure conduit 21, so that two pressure conduits 21 intersect in the intersection of the bridging element 10'. For each of these two pressure conduits 21, a cavity 9.1 and 9.2 respectively is configured in the bridging element 10'. The section of FIG. 13 is located in the cavity 9.1. which, between the inlet portions of the bridging element 10' opposite each other, could take the form of a straightforward hole. Preferably, however, this is widened by undercuts 25.1 in the intersection. Configuring the cavities 9.1 and 9.2 separate from each other prevents the intersecting pressure conduits 21 from squeezing each other during their expansion. The shape of the cavity 9.1 has the effect that the pressure conduit 21, accommodated therein, expands into the undercuts 25.1 of the cavity 9.1 which results in the joint being additionally strengthened in the longitudinal direction of the pressure conduit 21. In the plane located therebelow, shown dot-dashed, this is achieved in the course of the compacting into the cavity 9.2, configured there, with undercuts 25.2 analogously at an angle of 90° to the intersecting plane.

FIG. 14 illustrates a longitudinal section through a pair of flow conduits comprising two nested flow conduits 16 and 16*a* arranged in a zone with filler 20. The flow conduit pair is formed by an outer flow conduit 16 and an inner flow conduit 16*a* located concentrically within the former. The outer flow conduit 16 is in direct contact with the surrounding filler 20. The outer flow conduit 16 is closed off at one end, i.e. it is configured as a blind flow conduit. At its open other end, the outer flow conduit 16 is connected to a thermal treatment system. Protruding through the open end into the outer flow conduit 16 is the inner flow conduit 16*a*, extending almost up to the closed end thereof. An annular gap remains between the inner flow conduit 16*a* and the outer flow conduit 16 over the full length with which the inner flow conduit 16*a* extends into the outer flow conduit 16. To obtain this annular gap, the inner flow conduit 16*a* is spirally wrapped by a tape 29 of a fiber material, for example a carbon fiber composite material. The tape 29 fulfills the two functions of locating the inner flow conduit 16*a* in the outer flow conduit 16 and of producing as good as possible heat transition from the outer shell surface area of the inner flow conduit 16*a* to the inner shell surface area of the outer flow conduit 16. For this purpose, fibers of another material are woven into the temperature resistant base material of the tape 29, which, compared to the base material, have a high thermal conductivity. The base material may be formed, for example, by carbon fibers and the material which, in comparison, has a better thermal conductivity, can be a metallic material. A third function is fulfilled by the tape 29 in its being spirally wound on the inner flow conduit 16*a*. Due to the spiral winding of the tape 29, a spiral or helical return flow conduit for the thermal treatment fluid exists in the annular space between the two flow conduits 16*a* and 16. The thermal treatment fluid is guided back by the spiral winding of the tape 29 on the inner flow conduit 16*a* over a flow path, which is thereby elongated and more particularly swirled, so that a turbulent return flow occurs with a heat transfer through the annular gap which is enhanced as compared to that of a laminar return flow.

For foaming the filler 20, hot thermal treatment fluid, generated by the thermal treatment system, is introduced into the inner flow conduit 16*a*. The thermal treatment fluid introduced passes through the inner flow conduit 16*a* up to the front end thereof, where it flows around the front edge of the inner flow conduit 16*a* outwardly and then flows back in the helical return flow conduit guided by the tape 29 many times around the inner flow conduit 16 to the thermal treatment system. The return flow of thermal treatment fluid heats the filler 20 up to the foaming temperature, if necessary, slightly above this temperature. Due to the heat exchange in counterflow, a particularly constant temperature is set in the outer flow of thermal treatment fluid. The temperature of the filler 20 is correspondingly uniform.

Internal thermal treatment is used in accordance with the invention, not only for heating the filler 20, but preferably also for a controlled cooling of the filler 20. For this purpose, the temperature of the outer flowing thermal treatment fluid is measured upon it leaving the zone with the filler 20. This measurement is preferably effectuated by means of a temperature sensor arranged in the return flow conduit. The sensor may be arranged in the part of the return flow conduit which is located in the jointing zone and thus measure the temperature of the thermal treatment fluid directly in the foaming zone. However, it may also be arranged in a part of the return flow conduit located outside of the jointing zone. If the thermal treatment fluid is provided in a closed circuit such a temperature sensor may also be arranged at any suitable position in the circuit as long as reliable conclusions can be drawn as to the temperature in the jointing zone. However, the thermal treatment fluid must not necessarily be handled in a closed circuit, instead it may also be generated by the thermal treatment system and then simply given off to the surroundings—cleaned, where necessary—after having passed through the inner flow conduit 16*a* and the outer flow conduit 16.

The measured temperature is compared to a predetermined maximum temperature. Depending on the result of the comparison, heating is either continued or discontinued. If, for example, the predetermined maximum temperature is attained or achieved over a predetermined period in time, or exceeded, the thermal treatment system changes over from heating to cooling. Cooling may be discontinued when a predetermined temperature, which may be sensed by the same temperature sensor as before, is attained or exceeded. The temperature sensor may be advantageously worked into the tape 29. In the event that the thermal treatment system comprises an internal combustion engine with a turbocharger for generating the energy, the internal thermal treatment may be so that exhaust air of the internal combustion engine is used as the heating fluid and the air supplied to the turbocharger as the cooling fluid. Then, when a change-over is made, the exhaust air is replaced by the supply air. Temperature-controlled thermal treatment with controlled heating and, where necessary, also cooling of the jointing material is of advantage for the production and strengthening of the composite of preformed bodies also in all other disclosed embodiments of a flow conduit.

What is claimed is:

1. A composite of preformed bodies in which
   a) preformed bodies are joined by means of a jointing clamp,
   b) said jointing clamp encases a space either alone or together with said preformed bodies, c) each of said preformed bodies protrudes into said encased space, d) said encased space is partly or fully filled with a consolidated filler, and e) said preformed bodies are compacted into a composite in said encased space by said jointing clamp and said filler, f) wherein at least one expanded pressure conduit is arranged in said encased space having been expanded by pressurization, and g) wherein said filler is compacted in said encased space due to the expansion of said pressure conduit.

2. A jointing method for joining preformed bodies comprising the steps:

a) locating a first preformed body and a second preformed body relative to each other, b) encasing, by means of a jointing clamp in a jointing zone of said preformed bodies, a space into which each of said preformed bodies protrudes and c) consolidating in said encased space a filler or exposing same to a consolidation such that d) said preformed bodies in said encased space are compacted into a solid composite by said jointing clamp and said consolidated filler, and e) wherein said filler is thermally treated from within by a flow conduit for a thermal treatment fluid, said flow conduit being arranged in said encased space.

3. A jointing method for joining preformed bodies comprising the steps:

a) locating a first preformed body and a second preformed body relative to each other, b) encasing, by means of a jointing clamp in a jointing zone of said preformed bodies, a space into which each of said preformed bodies protrudes and c) consolidating in said encased space a filler or exposing same to a consolidation such that d) said preformed bodies in said encased space are compacted into a solid composite by said jointing clamp and said consolidated filler, e) wherein
at least one expandable pressure conduit is arranged in said encased space
said pressure conduit is expanded by pressurization, and
said filler is compacted in said encased space due to expansion of said pressure conduit.

4. The jointing method as set forth in claim 3, wherein a heating fluid is directed through said pressure conduit, resulting in melting of said filler.

5. The jointing method as set forth in claim 3, wherein said filler is formed by a plastics material or comprises a plastics material.

6. A jointing method for jointing preformed bodies comprising the steps:

a) locating a first preformed body and a second preformed body relative to each other, b) encasing, by means of a jointing clamp in a jointing zone of said preformed bodies, a space into which each of said preformed bodies protrudes and c) consolidating in said encased space a filler or exposing same to a consolidation such that d) said preformed bodies in said encased space are compacted into a solid composite by said jointing clamp and said consolidated filler, e) wherein
arranged in said encased space is at least one pressure conduit of a cold or semi-cold formable metallic material,
said pressure conduit is pressurized with a pressurizing fluid and thus expanded and
said preformed bodies in said encased space are compacted into said composite solely by said expanded pressure conduit forming said filler.

7. The composite as set forth in claim 1, wherein protruding from each preformed body is at least one joining section clasped by said jointing clamp.

8. The composite as set forth in claim 1, wherein
said filler is formed by a plastics material or comprises at least a plastics material.

9. The composite as set forth in claim 1, wherein said pressure conduit is formed by a metallic material which is cold or semi-cold formable.

10. A composite of preformed bodies in which a) preformed bodies are joined by a jointing clamp, b) said jointing clamp encases a space either alone or together with said preformed bodies, c) each of said preformed bodies protrudes into said encased space, d) said encased space is partly or fully filled with a consolidated filler, and e) said preformed bodies are compacted into a composite in said encased space by said jointing clamp and said filler, f) wherein arranged in said encased space is at least one pressure conduit of a cold or semi-cold formable metallic material, said pressure conduit having been expanded by pressurization, and g) wherein said preformed bodies in said encased space are compacted into said composite solely by said expanded pressure conduit forming said filler.

11. The composite as set forth in claim 1 wherein protruding from each preformed body is at least one joining section clasped by said jointing clamp.

12. The method as set forth in claim 2 wherein
at least one joining section is configured at each preformed body,
said preformed bodies with their joining sections are placed against each other, and
a second jointing clamp is placed to clasp said joining sections to thus form said encased space.

13. The method as set forth in claim 3 wherein
at least one joining section is configured at each preformed body,
said preformed bodies with their joining sections are placed against each other, and
a second jointing clamp is placed to clasp said joining sections to thus form said encased space.

14. The method as set forth in claim 6, wherein
at least one joining section is configured at each preformed body,
said preformed bodies with their joining sections are placed against each other, and
a second jointing clamp is placed to clasp said joining sections to thus form said encased space.

15. The method as set forth in claim 3 wherein said filler is first put into a flowable condition in said encased space or is already filled into said encased space in a flowable condition.

16. The method as set forth in claim 6 wherein said filler is first put into a flowable condition in said encased space or is already filled into said encased space in a flowable condition.

17. The method as set forth in claim 3 wherein said filler is heated in said encased space and thus cured.

18. The method as set forth in claim 6 wherein said filler is heated in said encased space and thus cured.

19. The method as set forth in claim 6 wherein a heating fluid is directed through said pressure conduit, resulting in melting of said filler.

20. The method as set forth in claim 6 wherein said filler is formed by a plastics material or comprises a plastics material.

21. The method as set forth in claim 3 wherein said filler is arranged in said encased space so that in said compacted composite it forms a parting layer between opposing surface areas of said preformed bodies or between opposing surface areas of at least one of said preformed bodies and said jointing clamp.

22. The method as set forth in claim 3 wherein said filler is thermally treated from within by means of a flow conduit for a thermal treatment fluid, said flow conduit being arranged in said encased space.

23. The method as set forth in claim 6 wherein said filler is thermally treated from within by means of a flow conduit for a thermal treatment fluid, said flow conduit being arranged in said encased space.

24. A jointing method for joining preformed bodies comprising the steps:

a) locating a first preformed body and a second preformed body relative to each other, b) encasing, by means of a jointing clamp in a jointing zone of said preformed bodies, a space into which each of said preformed bodies protrudes and c) consolidating in said encased space a filler or exposing same to a consolidation such that d) said preformed bodies in said encased space are compacted into a solid composite by said jointing clamp and said consolidated filler, at least one expandable pressure conduit, is arranged in said encased space, said pressure conduit is expanded by cold forming or semi-cold forming of a cold or a semi-cold formable metallic material and said filler is compacted in said encased space due to expansion of said pressure conduit.

* * * * *